United States Patent
Bittner et al.

(10) Patent No.: US 6,454,294 B1
(45) Date of Patent: Sep. 24, 2002

(54) HIGH CLEARANCE VEHICLE

(75) Inventors: Roy A. Bittner, New Holstein; Marcus J. Ridenour, Chilton, both of WI (US); Richard E. Jennings, Lisbon, IA (US)

(73) Assignee: Miller St. Nazianz, Saint Nazianz, WI (US)

( * ) Notice: Subject to any disclaimer, the term of this patent is extended or adjusted under 35 U.S.C. 154(b) by 0 days.

(21) Appl. No.: 09/115,259

(22) Filed: Jul. 14, 1998

(51) Int. Cl.$^7$ .................................................. B60G 5/00
(52) U.S. Cl. ........................ 280/677; 280/678; 280/781; 180/900; 180/68.4
(58) Field of Search ................................ 280/677, 678, 280/781, 788, 6.157; 180/900, 902, 68.4, 68.6; 384/420, 425, 426

(56) References Cited

U.S. PATENT DOCUMENTS

| | | | |
|---|---|---|---|
| 648,562 A | * 5/1900 | Hemphill | 384/425 |
| 948,600 A | * 2/1910 | Vannoy | 384/425 |
| 3,726,540 A | * 4/1973 | Grooss | 280/677 |
| 3,876,911 A | * 4/1975 | Nichols | 180/51 |
| 3,878,911 A | * 4/1975 | Nichols | 180/51 |
| 3,964,565 A | 6/1976 | Cagle et al. | 180/70 |
| 4,175,763 A | * 11/1979 | Conner, Jr. | 280/677 |
| 4,223,904 A | * 9/1980 | McColl | 280/677 |
| 4,275,918 A | * 6/1981 | Franco | 296/190 |
| 4,379,522 A | 4/1983 | Elliott et al. | 239/167 |
| 4,483,552 A | * 11/1984 | Dorscht | 280/690 |
| 4,512,516 A | 4/1985 | Ballu | 239/168 |
| 4,514,201 A | * 4/1985 | Brown | 55/385 B |
| 4,746,065 A | 5/1988 | Gorder | 239/168 |
| 4,793,742 A | 12/1988 | Strand | 406/79 |
| 4,852,809 A | 8/1989 | Davis et al. | 239/654 |
| 4,913,344 A | 4/1990 | Bauer | 239/112 |

(List continued on next page.)

OTHER PUBLICATIONS

RJ Mfg, Inc., "Walker 44 & 44 Ultra", brochure (6 pp), edition RJM 10M, Nov. 1999.*
Invoice from "Priority Printing & Mktg", for "RJ Mfg", towards printing of "Walker 44", 11×17 brochure, Jan. 24, 1997.*
Receipt of Payment to "Priority Printing & Mktg", for amt of $6535.08, towards Invoice #00970121, check #5818, Feb. 19, 1997.*

(List continued on next page.)

*Primary Examiner*—Paul N. Dickson
*Assistant Examiner*—L. Lum
(74) *Attorney, Agent, or Firm*—Whyte Hirschboeck Dudek SC

(57) ABSTRACT

A high clearance vehicle includes a walking beam frame and an independent suspension. The frame consists of a main frame, A-shaped frames, a main truss, leg braces, and an axle. Pins which are used to join each A-shaped frame and leg braces to the main truss act as pivot points, as does the pin that attaches the axle to the main frame. Each leg brace may connect to each A-shaped frame by an elastic member to provide the independent suspension. Legs are at each corner of the frame. At the bottom of each leg is a wheel hub mount with a wheel drive assembly operably connected to a wheel for propelling the vehicle. At the top of the front legs are tapered kingpins which carry segmented thrust washers having a knob and receiving portion. A boom having extension arms and spray nozzles may also be attached. The walking beam frame may include a crab steering device which shifts the rear axle off-center so that the vehicle dog legs. A hinge stacked assembly includes a self-cleaning screen, a condenser, oil cooler, and a radiator. Angled hinges allow a door to be opened away from the vehicle and the rear tire so that the stacked assembly is easily accessible to maintenance. A knee action suspension may also provide independent suspension to the vehicle. The boom may have upper and lower lift arms. An elastic member may be provided for supporting the lower lift arm.

17 Claims, 24 Drawing Sheets

U.S. PATENT DOCUMENTS

| | | | |
|---|---|---|---|
| 5,006,135 A | * 4/1991 | Friesen | 55/286 |
| 5,039,129 A | 8/1991 | Balmer | 280/840 |
| 5,042,602 A | * 8/1991 | Nakatani et al. | 180/68.1 |
| 5,052,627 A | 10/1991 | Balmer | 239/655 |
| 5,066,030 A | 11/1991 | Brett et al. | 280/92 |
| 5,125,583 A | 6/1992 | Strand | 239/655 |
| 5,178,328 A | 1/1993 | Broyhill | 239/168 |
| 5,209,320 A | * 5/1993 | Harrer | 180/235 |
| 5,234,051 A | * 8/1993 | Weizenburger et al. | 165/41 |
| 5,267,696 A | 12/1993 | Balmer | 239/662 |
| 5,335,739 A | * 8/1994 | Pieterse et al. | 180/6.3 |
| 5,353,988 A | 10/1994 | Gallenberg | 239/164 |
| 5,375,767 A | 12/1994 | Thorstensson | 239/164 |
| 5,464,243 A | 11/1995 | Maiwald et al. | 280/638 |
| 5,481,876 A | 1/1996 | Bay et al. | 60/454 |
| 5,489,114 A | 2/1996 | Ward et al. | 280/638 |
| 5,516,044 A | 5/1996 | Thorstensson | 239/159 |
| 5,597,172 A | 1/1997 | Maiwald et al. | 280/672 |
| 5,785,139 A | * 7/1998 | Freedy et al. | 180/68.1 |
| 6,116,626 A | * 9/2000 | Cherry et al. | 280/124.135 |

OTHER PUBLICATIONS

John Deere, All–New 4700 Sprayer, DKA119 Litho in U.S.A. (96–07).

R&J Manufacturing, Inc., Walker 44: Practical Innovation from the Ground Up.

Wilmar Manufacturing, Eagle™ Series, Eagle™ 8100 brochure.

Ag Chem Equipment Co., Inc., Rogator® 544 flyer.

GVM, Row–Cat 800–G flyer.

Tyler Industries, New Patriots™: Engineered to take to the field brochure.

* cited by examiner

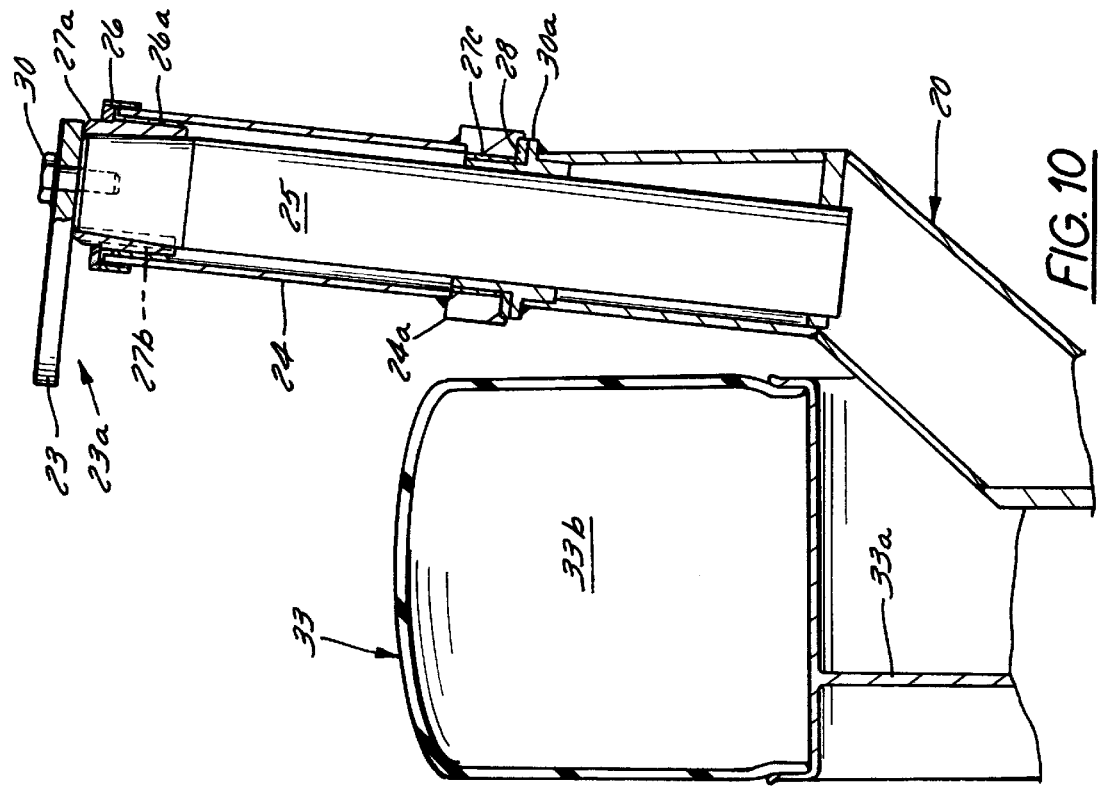
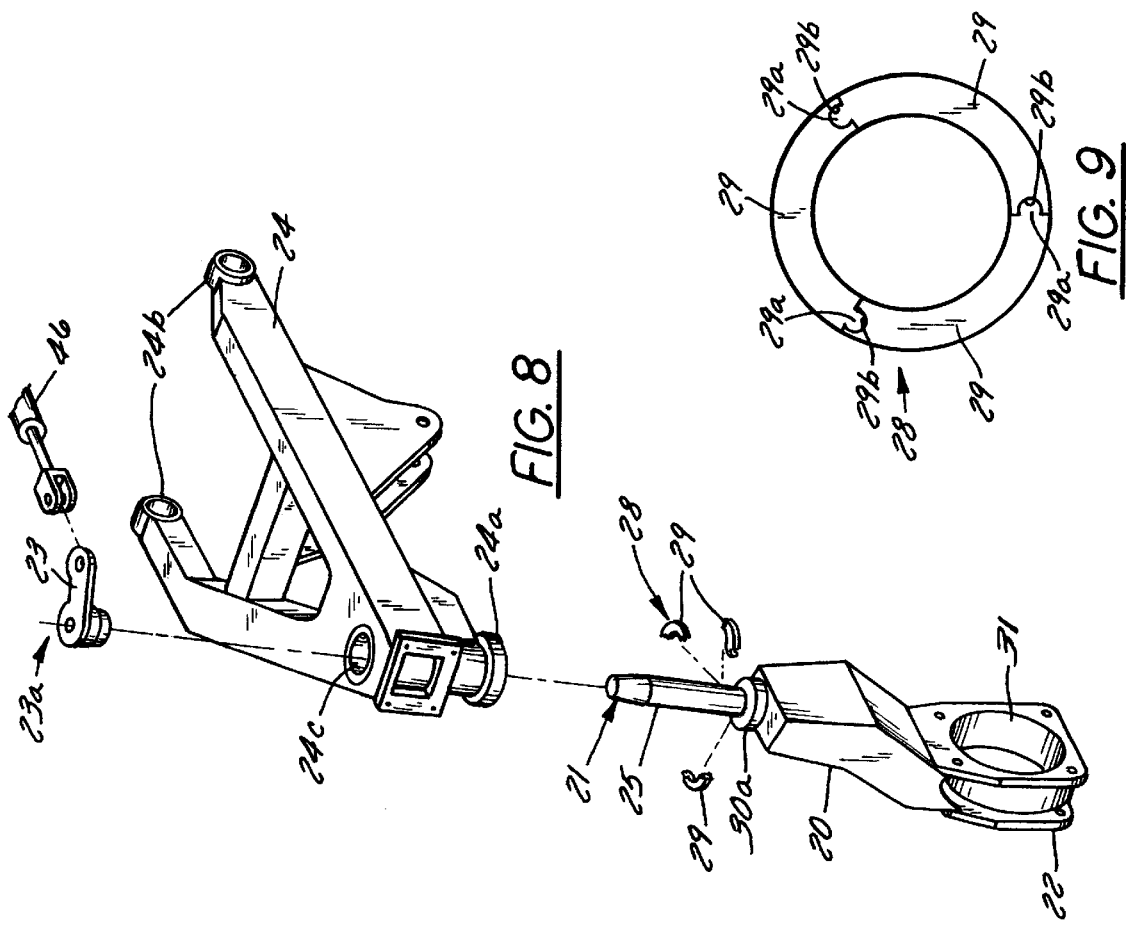

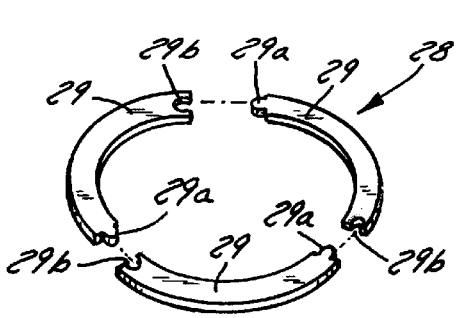
FIG. 11
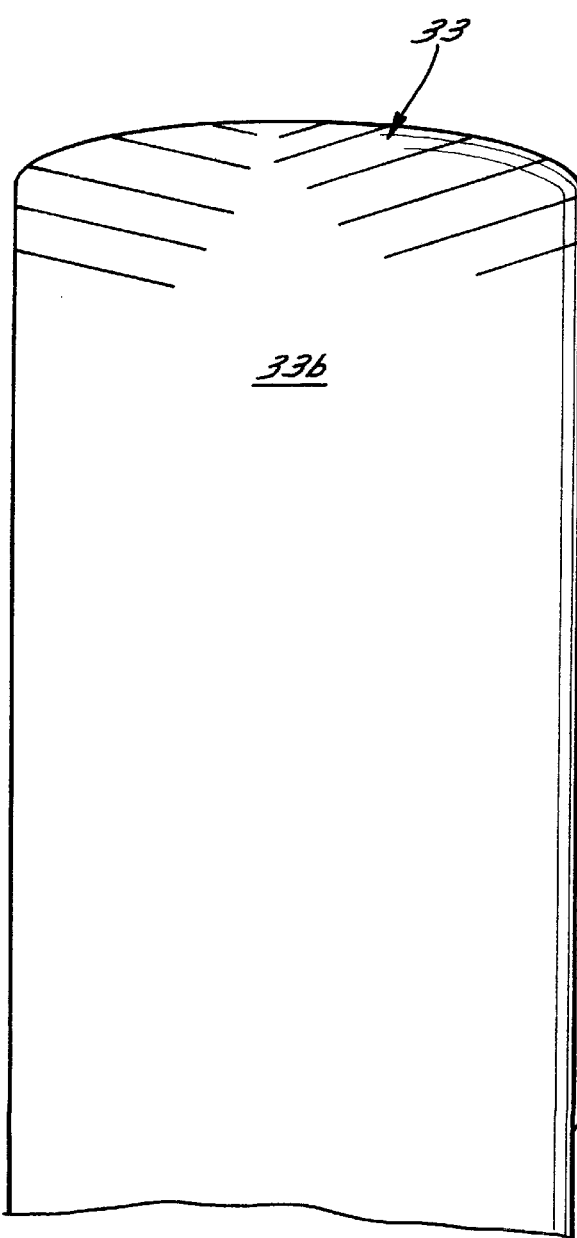
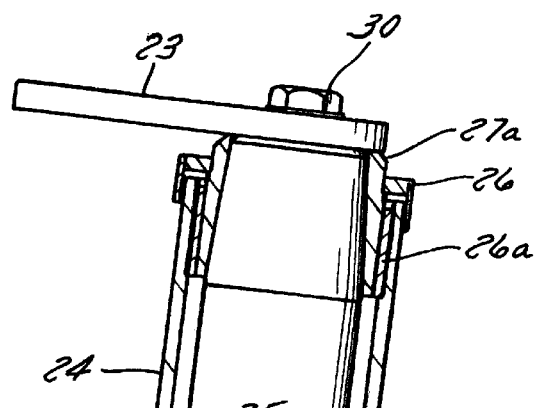
FIG. 12

HIGH CLEARANCE VEHICLE

BACKGROUND OF THE INVENTION

1) Field of the Invention

The present invention relates to vehicles, and in particular to high clearance vehicles for general agricultural use.

2) Related Art

High clearance agricultural vehicles have been known for years. They are particularly useful in spraying row crops. In this instance, these are typically designed for use with maturing corn of four or five feet in height and in order to avoid damage to the crop, the vehicles have a general clearance at least equal to the height of the rows of crops, (hence the vehicles are relatively tall pieces of equipment). These vehicles generally have at least two drive wheels the width of which allows the vehicle to pass between two different crop rows. The vehicles are also equipped with a boom which extends outwardly from both sides of the vehicle to spray relatively large crop areas at a time.

In one manner of application, sprays are applied to the crops during the tilling stage when the crops are quite small and a conventional ground-type crop sprayer could traverse the field without causing damage to the small plants. However, conventional ground supported crop sprayers are usually not suitable during the latter stages of growth. For example, during the stem extension stage, the likelihood of damage to the standing crops increases if the spray is applied by a ground traversing conventional crop sprayer.

Conventional crop sprayers are even more unsuitable for applying agricultural sprays during the heading and ripening stage of the crop. However, in order to obtain a good yield, it is often necessary to apply spray, for example, a fungicide, during the these stages especially to crops such as, wheat, barley, and the like. Spraying at these latter stages of growth has been typically done by aerial spraying in order to avoid damage to the standing crop. The effectiveness of aerial spraying is dependent in large part upon the weather conditions, and even then, the application of the spray is not as effective as ground spraying if damage to the standing crop can be avoided. Further, the spray must be concentrated when applied by crop aerial dusting because of the limitations of the capacity of the aerial sprayer.

Because spray vehicles operate over rough ground and in tall mature crops, various devices are used to help cushion the vehicle, operator, and boom from the effects of these rough surfaces. Most of these devices suffer from one or more disadvantages such as limited cushioning or bulkiness leading to interference with spraying the crop. A cushioned wheel arrangement, such as the front wheel suspension shown in U.S. Pat. No. 5,066,030, is available for relatively small sprayers with a single steerable wheel. However, such a suspension is not suitable for most larger sprayers or sprayers having two or more steerable wheels. Some available self-propelled sprayers have strut suspensions such as the one disclosed in U.S. Pat. No. 5,597,172. Strut shaft type suspensions may not have the ability to provide all of the traction necessary to move freely about rough terrain. Furthermore, the strut shafts may bend under rough terrain conditions thus making the vehicle less durable.

Sprayer suspensions with strut shafts may also include steel suspension springs immersed in oil. However, these often leak, and require supports with relatively large diameters both above and below the axle which interfere with the crops. Therefore, providing adequate cushioning without adversely affecting the crops continues to be a problem. Further, commercial systems with spring suspension systems have added cab roll on sloping terrain which results from compression of the springs.

U.S. Pat. No. 5,353,988 shows another suspension system. One of the drawbacks of this system is that the swing arms pivot point is high (for ground clearance) and the wheels are low. This configuration can cause problems when the vehicle hits a bump because the wheels move out as much as they do up. Thus, every bump the vehicle hits tends to shove the wheel into the crop which can damage the crop. Moreover, as the vehicle's load gets heavier or lighter, it changes its wheel track, so that when it's fully loaded it may be running over the outside rows and when it is empty it may be running over the inside rows.

Because row spacings in row crop situations can vary from field to field, the wheel track of the spray vehicle must be adjusted accordingly. Linkage adjustments may be time-consuming and inconvenient. For example, when spraying solid seeded crops such as wheat or barley, sprayers must drive directly over the plants which may cause damage. An adjustable linkage for a sprayer is shown in U.S. Pat. No. 5,464,243. Other vehicles can manually widen one set of wheels independent from the other to reduce the potentially damaging track of their wheel configurations. However, manually adjusting the wheel configurations can take a considerable amount of time and thus again reduce the vehicle's productivity.

Steering arrangements for cushioned sprayer wheel assemblies include those with steering arms at the tops of the strut shafts. Such top mounted arm arrangements often have an undesired movement of the steerable wheels over rough ground surfaces, referred to as bump steering, as the steering arms move up and down with the strut shafts.

Conventional vehicle tanks may contain one tank for product, a separate tank for rinse water, and another tank for foam marker fluid. All of these tanks increase the surface area of the vehicle which makes the vehicle more difficult to clean. Further, this multitude of tanks adds unwanted bulk and takes up space on the vehicle which could be put to better use. Connecting these various tanks to each other, to the boom, and to the vehicle involves a complex connection of hoses, circuitry, and clamping devices. These aspects make it difficult for the operator to move around the tanks when it is necessary to plumb them and clean them.

Some booms contain little or no suspension. These booms that do contain suspension may have tilt cylinders out at the ends of the booms to adjust height and provide some suspension or they may have some other elastic member to take the shock out during travel over rough terrain. However, as a boom increases in length, for example, fifty feet or more, the travel at the ends of the boom may become more violent when moving over rough terrain which may cause the boom to hit the ground or, even worse, snap. Moreover, a violently bouncing boom that is uncontrolled may translate this energy to the vehicle making it increasingly less stable and more difficult to control (which, in turn, can effect the precise application of spray to the crops).

Maintaining good visibility from the cab of the spray vehicle to the crops, the boom and nozzles and maintaining a direct line of sight from the cab to the wheels is also important but has been problematic in the past. For example, some commercial systems have the boom and the nozzles mounted behind the cab. This forces the operator to constantly turn and bend to maintain visibility.

Some high clearance vehicles rely on conventional cooling systems to suck air past the engine and the hydraulic oil cooler. These systems may become clogged with dust and debris when the high clearance vehicle is operating in early spring or late fall field environments. When air flow is effected, engine and drive system efficiency is reduced. The possibility of overheating increases also. These problems can lead to decreased fuel efficiency, increased down time, and even worse, permanent damage to the engine and/or the hydraulic oil system.

Most commercial systems contain thrust washers within their steering systems. Thrust washers bear the weight of the load. For example, when the wheels are turned, the wheels pivot and the load bears down on the thrust washers which then carry this thrust force until the vehicle has completed its change in direction. When servicing these thrust washers, some systems require that the operator remove all hoses and connections to the wheels, jack up the vehicle, remove the wheel, and remove the entire hub and kingpin before removal of the thrust washer is possible. This can be a major operation, and it increases vehicle down time, thus decreasing the operator's and vehicle's productivity.

Given the above-described deficiencies of existing high clearance vehicles, the industry has a continuing interest in designing such a vehicle with an improved suspension system that minimizes crop interference and bump steer problems, a smoother ride, improved boom visibility and suspension, an improved cooling system, an improved tank design, a wheel configuration which improves traction and minimizes damage to crops, and ready access to operating parts for ease in service and repair.

The above-referenced U.S. patents disclose embodiments that were at least in-part satisfactory for the purposes for which they were intended. The disclosures of all the above-referenced prior United States patent, in their entireties are hereby expressly incorporated by reference into the present application.

SUMMARY AND OBJECTS OF THE INVENTION

It is an object of the present invention to provide an improved suspension for a high clearance vehicle.

It is a further object of the present invention to provide an improved suspension for a high clearance vehicle so crop interference is minimized.

It is another object to provide an improved suspension wherein cushioning and steering components are advantageously located so that crop interference is minimized.

It is yet another object to provide such a suspension which minimizes bump steering problems.

It is a further object to provide a high clearance vehicle having a generally smoother ride over rough ground surfaces than most previously available high clearance sprayers.

It is still another object to provide a row crop sprayer having improved boom visibility and suspension.

It is another object of the present invention to provide an improved cooling system which is also easier to access and maintain.

It is a further object to provide a sprayer having an improved tank design for easier transport and cleaning.

It is an additional object to provide a vehicle having improved traction and a less damaging wheel track.

It is a yet further object of the present invention to provide a vehicle which allows improved access to its operating parts for service and repair.

A high clearance vehicle constructed in accordance with the teachings of the present invention includes a walking beam frame, an independent suspension, a cab, a tank, a boom, and an engine and wheels for propelling the vehicle. A main frame forms part of a walking beam frame which may further include a main truss connected to the main frame, a pair of leg braces connected to the main truss, an elastic member connected to each leg brace, a swing arm connected to each elastic member, and a rear telescoping axle beam connected to the main frame. A pair of rear legs are connected to the rear telescoping axle beam and a pair of front legs are connected to each swing arm. Each leg includes a top and a bottom, an integral kingpin, and a hub mount. The wheels are connected to each hub mount. A steering arm is connected to the top of the leg.

The walking beam frame provides shock absorption by allowing the frame to oscillate or flex front to back and side to side about pivot points to ensure generally constant ground contact with all four wheels. It does this by having each front leg connected to a rear leg so that the pair rotates about a pivot point in a coordinated oscillation. The rear axle beam also rotates about a pivot point. In addition to the walking beam frame, independent suspension is provided through the use of elastic members. For example, an elastic member may be operably connected between the swing arms and the leg braces to provide independent suspension to the front legs. Additionally, independent suspension may be provided to the legs individually by use of an elastic member within the confines of a wheel rim attached to each of the legs. This elastic member may be part of a knee action suspension. The knee action suspension may be on any or all of the wheels. Moreover, because the inventive oscillating, walking beam frame in combination with independent suspension operates without a tie rod, there is a reduction in the amount of bump steering.

The walking beam frame may include a crab steering device which acts in cooperation with the frame. The crab steering device includes an actuating member mounted to at least one of the rear legs and a telescoping round tubular axle beam connected to the rear legs. The round tubular rear axle allows for rotation of two round tubular members which make up the axle. The actuating member is mounted to the main frame and to at least one of the round tubular rear frame members to allow the rear wheels to "crab" or "dog leg". The actuating member may be mounted so that the vehicle can track left, track right, or track both left or right.

The high clearance vehicle of the present invention also has a hinged stacked assembly including a condenser, an oil cooler, and a radiator mounted behind the engine of the vehicle. A hinged door covers the stacked assembly. The door has a hole in it covered by a cylindrical screen which is operably associated with the door and covered with a plastic cover. Within the cylindrical screen is a fan blade for drawing air through the screen. An axle is connected to the fan blades and internal baffles communicate with a portion of the axle. A radiator fan draws air through the screen past the fan blades creating a vacuum for airborne debris. The debris sucked on to the cylindrical screen drops off as the cylindrical screen rotates past the baffles. Thus, a flow of fresh air to the condenser, oil cooler, and radiator remains constant.

The kingpin is integral with at least one of the front legs. The kingpin inserts into a hole in the swing arm or A-shaped frame. Each leg includes a top and a bottom. The steering arm is connected to the top of the leg to provide control to the leg when steering the vehicle. The positioning of the steering arm allows for maximum clearance underneath the beam frame as well.

Below the swing arm is a lower bushing which is adjacent to a segmented thrust washer. In one embodiment, the segmented thrust washer is made of high molecular weight plastic and divided into a multitude of pieces to allow for easy maintenance. Each segment may have either a lobed end or a receiving end. Each lobed end fits into a receiving end on another segment. During maintenance, the A-shaped frame can be raised off of the thrust washer and the lower bushing so that the thrust washer is accessible.

The tank is comprised of a large main tank with a bulkhead inserted inside the main tank to split the tank into at least two (2) compartments. The larger compartment is for the product and the smaller compartment is for fresh water to rinse the tank after the application of the product is complete. There is a hole in the top of the main tank to allow a cylindrical tank to be dropped within, forming a third compartment that is designed to be pressurized to contain a foam marker fluid.

Connected to the frame is also a boom lower lift arm and an upper lift arm. The lower lift arm and the upper lift arm carry the boom which is rotatably connected to at least one lift arm. The configuration of the boom maximizes operator visibility. An elastic member is connected to the lower lift arm for supporting the weight of the boom by forming a falling rate suspension.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and fonning a part of this specification, wherein like reference numerals designate the same elements in the several views, and in which:

FIG. 8 is a perspective view of a front portion of vehicle of FIG. 1;

FIG. 9 is a top plan view of a thrust washer for the vehicle of FIG. 1;

FIG. 10 is a sectional view showing the structure of FIG. 8 with a mounted wheel and rim;

FIG. 11 shows a disassembled thrust washer of FIG. 9;

FIG. 12 shows a partial sectional view of the structure of FIG. 10 during maintenance and removal of the thrust washer of FIG. 9;

DESCRIPTION OF PREFERRED EMBODIMENTS

The present invention and the various features and advantageous details thereof are explained more fully with reference to the non-limiting embodiments described in detail in the following description.

Figure 2:
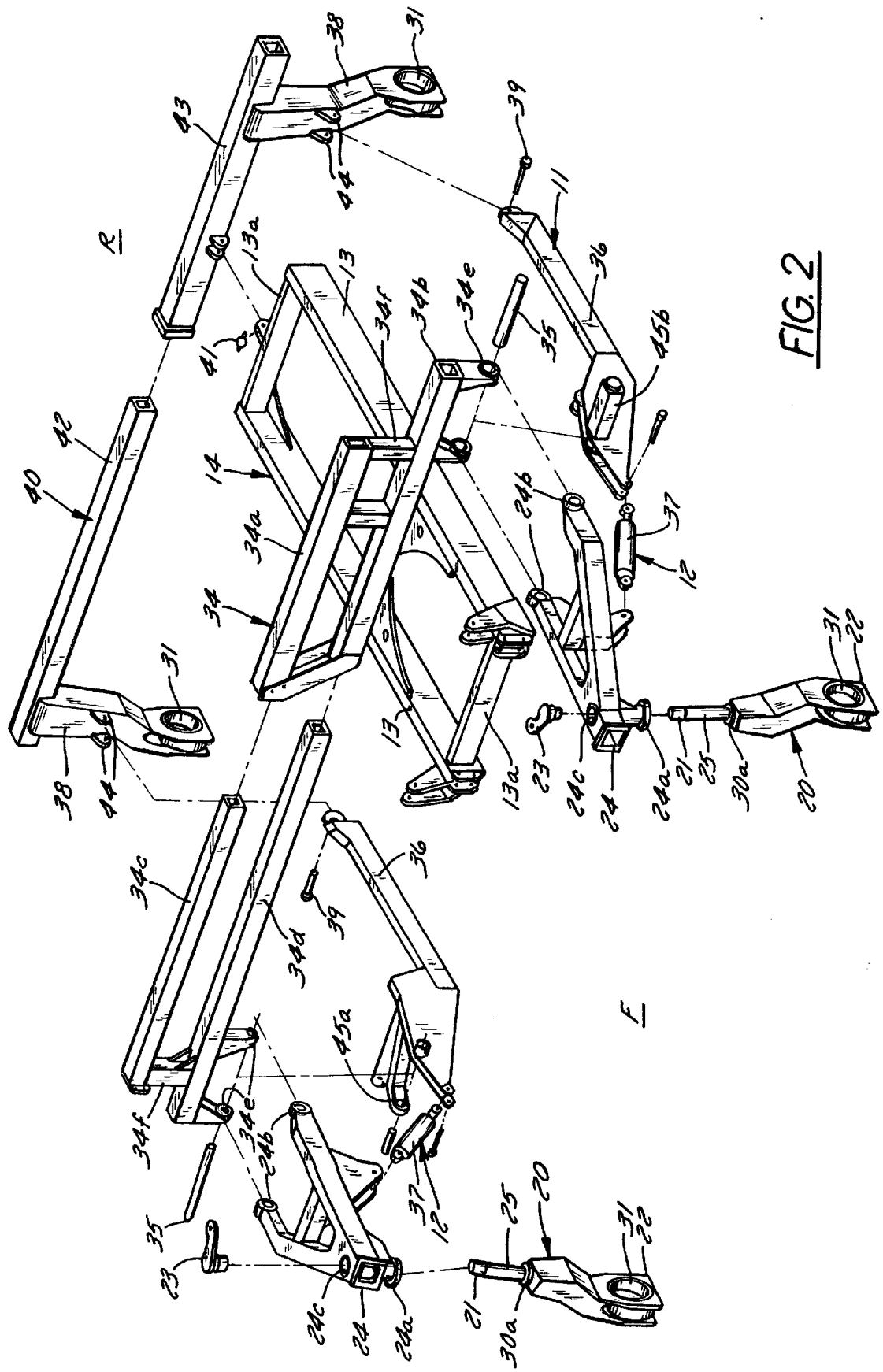
FIG. 2 is an exploded view showing a walking beam frame and independent suspension for the vehicle of FIG. 1.
Figure 3:
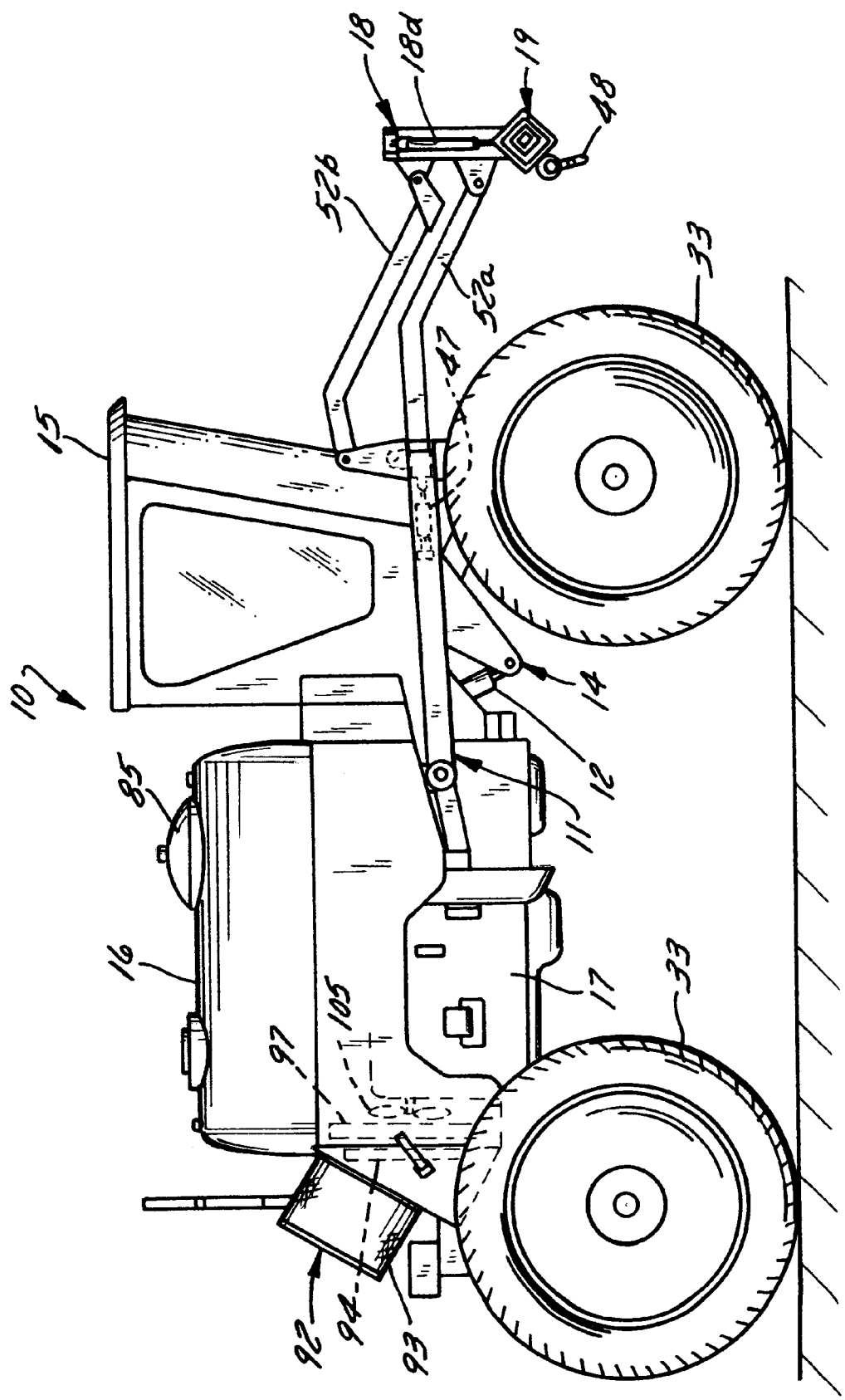
FIG. 3 is a side elevational view of the vehicle of FIG. 1.

Referring generally to the drawings 1–35 and more specifically to FIG. 3, it can be seen that high clearance vehicle 10 includes oscillating or walking beam frame 11 and an independent suspension 12. Pursuant to the present invention, as seen in FIG. 2, the oscillating or walking beam frame 11 consists in part of main frame 14 made up of a pair of rails 13 extending longitudinally from the front (F) of the vehicle to the rear (R) of the vehicle 10, and a pair of cross members 13a, one at the front and one at the rear which connect the rails 13.

Figure 1:
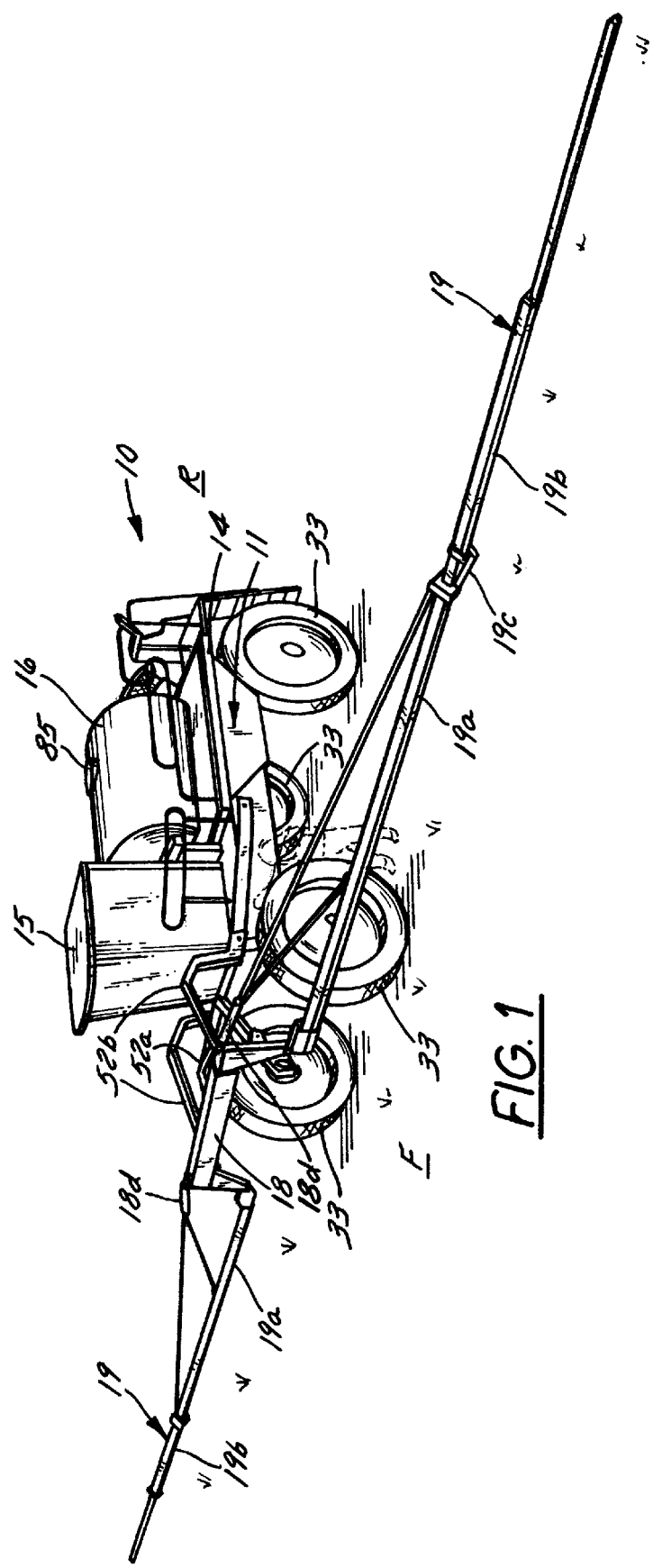
FIG. 1 is a perspective view of a vehicle of the present invention.

Main frame 14 is preferably constructed of steel rectangular or box tubing which make up rails 13 and cross beams 13a. The steel box tubing supplies sufficient strength for frame 14 to prevent the torque from twisting and damaging the frame 14. Steel I-beams may also be used. Preferably, cross members 13a are welded to rails 13. Welded members, such as these, are sometimes referred to in the art as a weldment. As shown in FIGS. 1 and 3, main frame 14 may carry cab 15 to provide shelter and riding comfort for the vehicle operator. Vehicle 10 may also carry tank 16. Tank 16 may be used to carry chemical product. rinse water, and/or foam marker. Engine 17 is also operably associated with the vehicle 10 to independently propel the vehicle, as shown in FIG. 3. A boom 18 is also attached to the frame 14.

As shown in FIG. 1, the boom 18 may have a variety of attachments including extension arms 19. The extension arms 19 may include a series of nozzles 48 for spraying (see FIG. 5). The boom 18 and extension arms 19 may be adjustable in height depending on the application and the type of crop being sprayed. Alternatively, the boom 18 may be equipped with seed corn detasseling heads, side dress injection bars for fertilizing, or tines for rotating compost.

FIG. 2 shows a front leg 20 located at each front corner of the oscillating or walking beam frame 11. Each front leg 20 has a top 21 and a bottom 22. A steering arm 23 is welded to a collar and is located at the top 21 of the leg 20. The steering arm 23 provides control to the leg 20 when the operator pushes to steer the vehicle 10. The positioning of the steering arm 23 on top of the leg 20 allows for maximum clearance under the beam frame 11. A bolt, key way, and tapered bushing aid in connecting the steering arm 23 to the top 21 of the leg 20. A swing arm or A-shaped frame 24 having a hole 24c slides over the slightly tapered top 21 of the leg 20 and onto a kingpin 25 which is integral with the front leg 20. The swing arm or A-shaped frame 24 may also form a part of the beam frame 11. The A-shaped frame 24 has a rim 24a which rests on the leg 20 and ear 24b which extend from the frame.

Seal 26 seals the space between steering arm 23 and kingpin 25 from debris, as best shown in FIGS. 10 and 12. Upper bushing 26a is under steering arm 23 and fits between A-shaped frame 24 and the kingpin 25 to reduce friction. A taper lock 27a and a key 27b are located between the kingpin 25 and the steering arm 23. The taper lock 27a and the key 27b aid in securing the steering arm 23 to the kingpin 25. Further down the kingpin 25 is a lower bushing 27c which rests on a thrust washer 28 and fits between rim 24a of the frame 24 and a collar 30a of the leg 20. The collar 30a is press fit onto the leg 20 around the kingpin 25 to provide reduced friction during movement of the kingpin 25. Referring to FIG. 10, the steering arm 23 may be secured to the leg 20 by a cap screw or bolt 30.

The thrust washer 28 absorbs the thrusting force created when the operator turns the vehicle 10 to steer it. The thrust washer 28 may be made of ultra high molecular weight plastic (UHMW). As shown in FIGS. 9 and 11, the thrust washer 28 includes a multitude of interlocking segments 29. In the preferred embodiment, the interlocking segments have a knob portion 29a and a receiving portion 29b which allow the segments 29 to interlock forming a generally round structure.

The segmented design of the thrust washer 28 aids in its servicing. For example, when it is time to service the thrust washer 28, the bolt 30, preferably consisting of a bolt, which retains the steering arm 23 at the top of the leg 20 is removed, as shown in FIG. 12. Next, the walking beam frame 11 is jacked up so that the kingpin 25 will slide down at least an inch from the A-shaped frame 24. Conveniently, it is not necessary to disconnect any hydraulic fluid hoses or other connection during this process. Space (S) created by jacking up vehicle 10 allows for the easy disassembly of thrust washer 28 by disconnecting the interlocking segments 29a, 29b.

The configuration of the front legs 20 through the use of kingpins 25 allows the vehicle 10 to have an about 13' turn radius. This allows the operator to have an unequaled placement precision of the chemicals being applied to the crop by the vehicle 10.

Figure 5:
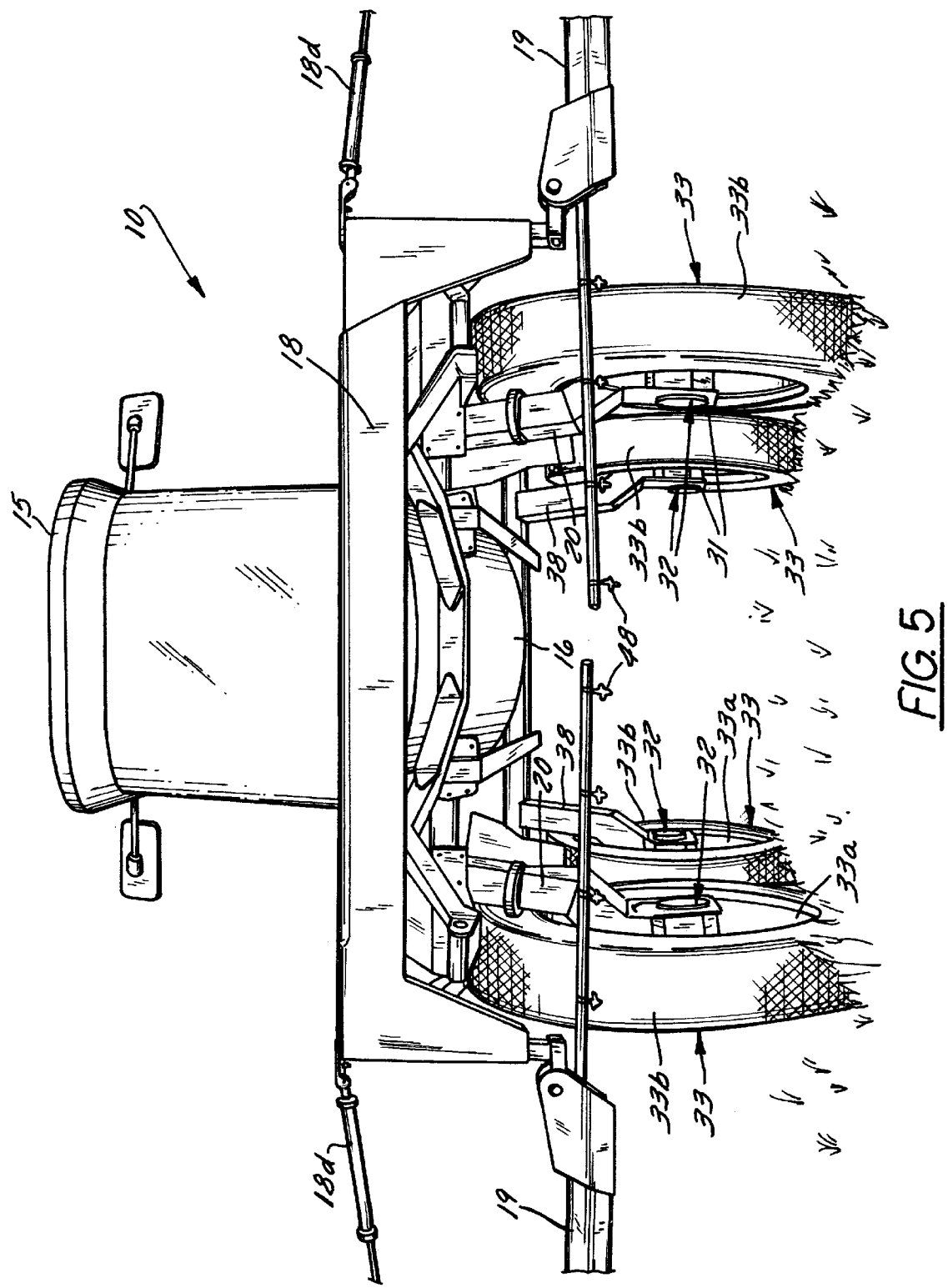
FIG. 5 is a front elevational view of the vehicle of FIG. 1.

At the bottom 22 of the leg 20 is a wheel hub mount 31 as seen in FIG. 2. As best seen in FIG. 5, within the wheel hub mount 31 is a wheel drive assembly 32 which is operably connected to a wheel 33. The wheel 33 includes a rim 33a and a tire 33b as is well-known in the art.

Swing arm or A-shaped frame 24 may be connected to the main frame 14 by means of a main truss 34 as best illustrated in FIG. 2. The main truss 34 is welded to the main frame 14. The main truss 34 may consist of upper and lower tubular beams 34a and 34b. The truss 34 may include an extendable upper beam 34c and an extendable lower beam 34d. The beams 34a and 34b and 34c and 34d may be joined by generally vertical members 34f for added strength.

Pins 35 are used to join each A-shaped frame 24 to the main truss 34. The A-shaped frame 24 and the main truss 34 may have ears 24b, 34e, respectively, with holes for receiving the pins 35. A pair of leg braces 36 may also be connected to the A-shaped frames 24 and the main truss 34 using these same pins 35. In the preferred embodiment, pins 35 provide pivot points for walking beam frame 11.

Additionally, each leg brace 36 is connected to each A-shaped frame 24 by an elastic member 37. This elastic member 37 may consist of an actuator and an accumulator. The elastic members 37 provide an independent suspension 12 to the front legs 20. In the preferred embodiment, the independent suspension 12 uses elastic members 37 comprised of nitrogen gas accumulators which in combination with the oscillating or leveling linkage of the walking beam frame 11 softens the ride over rough terrain, such as deep ruts, ditches, center-pivot tracks and terraces, even when the vehicle 10 hits them head on.

The present invention's independent suspension not only increases operator comfort. but also helps protect the boom arms 19 from vertical shock and produces a more uniform spray coverage. First, the vehicle's coordinated frame 11 oscillation follows severe contours with minimal weight transfer by distributing its weight evenly over all wheels 33. Second, the swing arms 24 help to keep the wheels 33 vertical through the full range of suspension travel, while the nitrogen gas dampened accumulators 37 support the vehicle's load uniformly. This controlled, cushioned independent wheel movement not only provides a smooth ride and reduces jolts, but also maintains wheel 33 traction even through multi-level terrain. On the other hand, while competitive vehicles have spring suspension systems, these systems introduce added cab roll on sloping terrain. However, because the present invention's combination suspension components widen with its wheels 33 when traversing irrigation ditches and center pivot tracks, the operator experiences less cab tilt and a more stable, secure ride.

Referring still to FIG. 2, toward the rear of vehicle 10 each leg brace 36 may be connected to rear legs 38 by ball and joint pin 39. The rear legs 38 may be connected to a rear axle beam 40 which is attached to the main frame 14 by a cleavis and spade ball joint pin 41. In the preferred embodiment, this pin 41 provides another pivot point for walking beam frame 11. The rear axle 40 may be constructed of two telescoping square tubular members 42 and 43. The rear legs 38 may be welded to each square tubular member 42,43. The legs 38 may have ears 44 to receive each of the ball and joint pins 39 which connect the rear legs 38 to the leg braces 36. As shown in FIG. 5, each of the rear legs 38 may have hub mounts 31 like the front legs 20. Drive assemblies 32 are operably connected to the hub mounts 31 in the rear legs 38. Wheels 33 including tires 33b and rims 33a are also operably associated with the rear legs.

Preferably, as stated previously, the main truss 34 has a telescoping or extendable truss made up of an upper 34c and lower 34d extension beams as shown in FIG. 2. The rear axle beam 40 has two telescoping components 42 and 43. The rear axle 40 and the truss 34 telescope to allow the vehicle 10 to expand its wheel width as may be necessary for a certain crop application. For example, the width between the legs 20, 38 may be adjusted from 105" to 152" to allow the operator to run the vehicle 10 in crop rows which may be 20" wide with less crop damage. This adjustment may be accomplished by a hydraulic adjust-on-the-go system controlled by a single rocker switch within the cab 15. This feature also allows for easier trailering of vehicle 10 when it is moved from field to field along the highway. The telescoping beam feature requires the connecting structure of leg braces 36 to truss 24 to be different on the telescoping side as shown in FIG. 2. For example on the telescoping side, the leg braces have L-shaped brace 45a attached. On the other, non-telescoping side, connecting tube 45b is provided.

Figure 6:
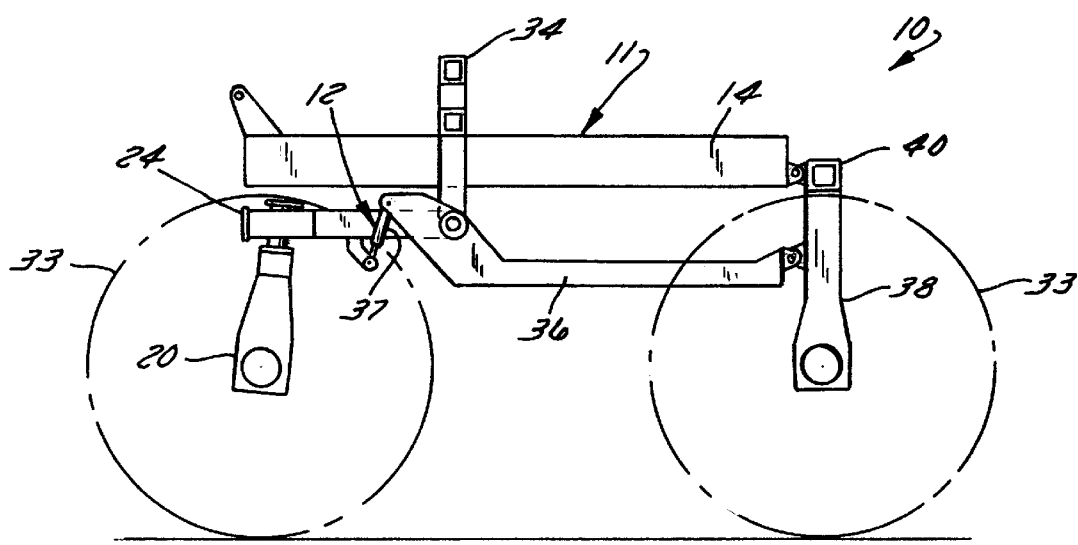
FIG. 6 is a schematic view of the walking beam frame and the independent suspension of FIG. 2 operating on level terrain.
Figure 7:
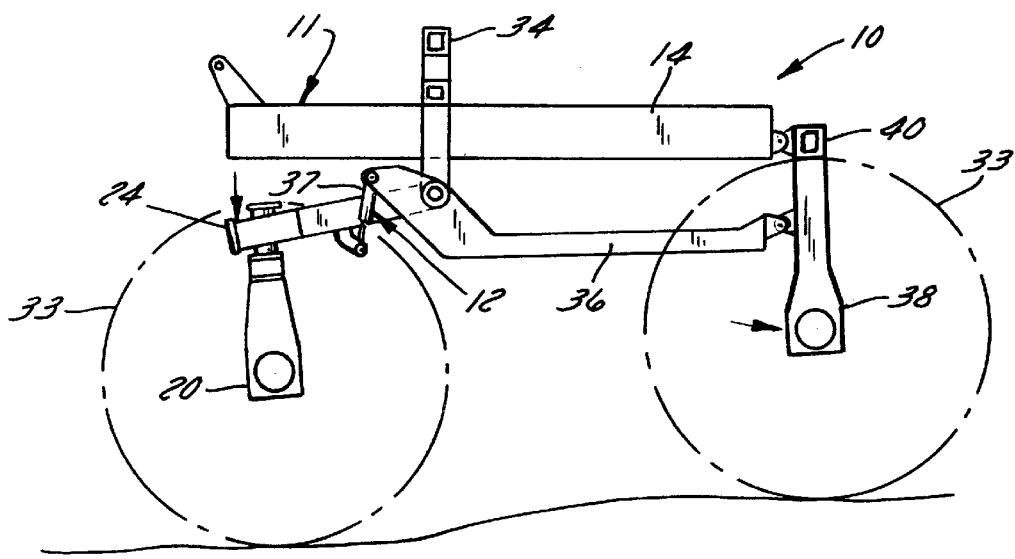
FIG. 7 is a schematic view of the walking beam frame and the independent suspension of FIG. 2 operating on rough terrain.

In operation, best shown in FIGS. 6 and 7, as the inventive vehicle 10 moves across rough terrain, the leg braces 36, connected swing arms 24, and rear axle 40 of the walking beam frame 11 are able to twist so that the cab 15 (not shown) and the tank 16 (not shown) which are carried by the main frame 14 stay relatively level. The independent suspension 12 allows the leg brace 36 and the A-shaped frame 24 to flex and thus keep the wheels 33 in contact with the ground to maximize the wheels traction. The elastic member 37 can be a coil spring, a hydraulic cylinder, an air bag or any known accumulator or actuator. The independent suspension 12 is intended to absorb shock which may be transferred to the frame 11 when the vehicle 10 hits unlevel ground such as a plow furrow. This results in a more stable and comfortable ride for the operator and the vehicle 10.

Figure 7A:
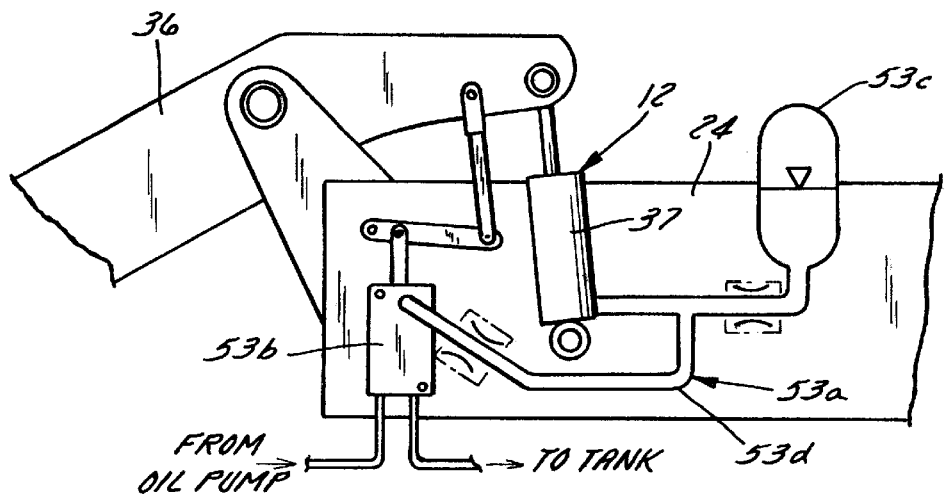
FIG. 7A is a partial schematic view of the walking beam frame and the independent suspension of FIG. 2 illustrating fluid flow within the independent suspension.

As shown in FIG. 7A, the elastic member 37 may employ a leveling control circuit 53a to compensate for weigh/load shift and to maintain constant frame 14 elevation to ground level. For example, if the elastic member 37 or cushioning element is an airbag, the softness of the ride, that is, the amount of travel that cushioning element has, would depend on the air pressure inside the bag. A airbag valve is provided to control pressure in that when pressure drops the valve opens up and pumps the bag back up to a consistent height. Added weight when fully loaded increases pressure giving an unregulated system a really stiff suspension and a really rough ride. However, when air is let out of the regulated airbag, the suspension drops down so its nice and spongy.

In the preferred embodiment as shown in FIG. 7A, circuit 53a is a hydraulic valve 53b in combination with an accumulator 53c. Therefore, the hydraulic oil in the accumulator 53c is changed so that the pressure in the elastic member 12 or cylinder 37 remains constant and the relative height of the machine and the softness of the ride at a given vehicle weight is controlled. Oil is trapped between the hydraulic valve 53b and the accumulator 53c and a hose 53d connects the two. There is a T in the hose 53d which goes to the hydraulic cylinder 37. The valve 53b is connected to two other things, a pump to pump the oil in if it needs more oil and a outlet tank if the circuit 53a needs to let oil back out. The valve 53b is also connected to the swing arm 24 to determine how far down the vehicle 10 sinks relative to the wheel 33 and thus determines whether the pump should come on. If the pump comes into play, it will either pump oil into that, into the valve or it will vent oil to the tank.

A hydraulic system is preferred because it is more compact and therefore can be located in a variety of positions upon the vehicle 10, whereas air bags have dimension and capacity limits. Hydraulic pressure also allows for the generation higher pressure than air pressure.

In commercially available vehicles, the limiting factor with the independent suspension is that when you go over a bump or over undulating terrain, the only way that the wheel can follow the ground is to press on the suspension spring to take the tension off. As soon as that happens, the weight of the vehicle transfers to the high side and thus the low side does not have any weight on it. This can be even more problematic if the drive system is hydrostatic, because in that case all of the hydraulic oil then shifts to the wheel that is easiest to spin and the vehicle spins out. With oscillating frame 11 and independent suspension 12 of the present invention, vehicle 10 follows the ground contour because the twisting frame members 24, 36, and 40 and wheels 33 have the ability to go up and down without actually having to compress the elastic member 37.

Hydro-static drive mechanism 64 is supplied with hydraulic oil by a pump 64a. An additional hydraulic pump 64b may be added to the hydro-static drive to drive the mechanism 64 so that in the event a wheel 33 does come off the ground. the oil is transferred to all four wheels 33 rather than just to the one wheel that spins the easiest. Pumps supplied in 1997 by Sunstrand are presently preferred. The Sunstrand pumps may be closed-center pressure compensation pumps which result in low heat generation, instant response, and simplified circuits with cooled return oil.

There are different ways of mounting pumps 64a and 64b on engine 17. One would be to mount the pumps separate and run a drive shaft to it . Another configuration is to bolt a gear box on to the fly wheel which has multiple ports and then connect each pump to the individual gear. In the preferred embodiment, pumps 64a, 64b are stacked end-to-end and each is bolted directly to the fly wheel. This eliminates the drive shafts and gear boxes, making a simple direct straightforward design.

Figure 7B:
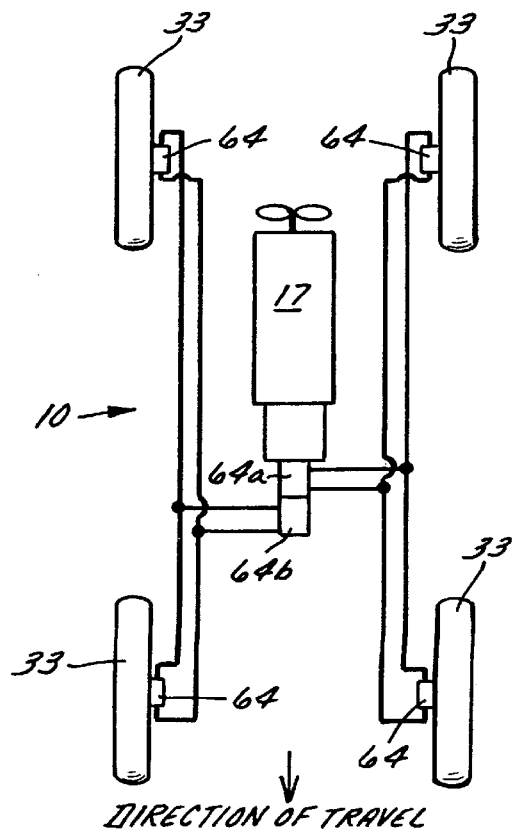
FIG. 7B is a schematic view of fluid flow to the drive system.

As shown in FIG. 7B, pump 64a drives the drive motors 64 on the left side of the vehicle 10 and pump 64b drives the drive motors 64 on the right side. Having the tandem propel pumps 64a, 64b each drive one side set of wheels provides numerous advantages including simpler pumping and plumbing. For example, not as many hoses need to cross over to the left side of the machine. There are also traction advantages to this system. For example, conventional systems have a criss-cross arrangement due to the fact that they do not have the oscillating frame 11. In these systems, there is limited travel so that if the machine crosses diagonally through a ditch it may high-center, that is, one wheel does not hit the ground, leaving it in a situation where, like a chair with one short leg, it has one wheel hanging off the ground. Conventional machines counter this problem by having the wheel drive system criss-cross so there generally is always one pump that has it's wheels on the ground giving the vehicle greater traction advantage in the situation when one wheel comes off the ground. Nevertheless, if the left set of side wheels are in the ditch with the right side up high, the high side spins out. Therefore, if you had criss-crossed drives, both pumps would have a wheel that would spin and the machine would be stuck. However, because vehicle 10 of the present invention has so much flex that never happens. Therefore, the tandem pumps 64a, 64b are provided with end-to-end configuration and are directly mounted to the engine 17 center line as shown.

Figure 4:
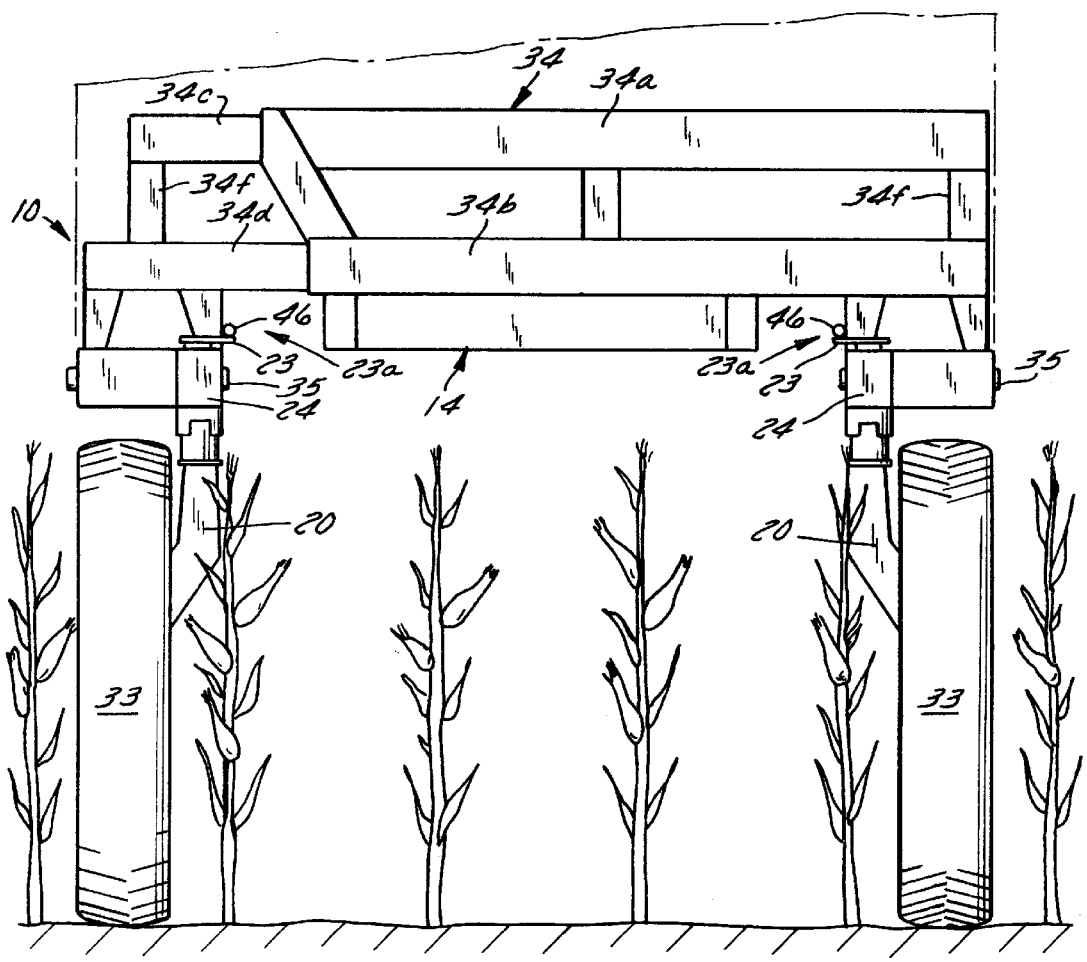
FIG. 4 is a partial front elevational view of the vehicle of FIG. 1 operating in a row of mature crops.

As shown in FIG. 8, the steering system 23a preferably includes a pair of steering arms 23 (which may be detachable for ease of maintenance) and connected steering cylinders 46. Each steering cylinder 46 holds hydraulic fluid which allows for steering control of the vehicle 10. Steering arm 23 and steering cylinder 46 are conveniently located on top of kingpin 25. Preferably, each steering cylinder 46 is connected directly to the steering arms 23 and there is no linkage in between, for example, there is no bell crank between the cylinder and the steering arms. The steering cylinders 46 are preferably phased cylinders arranged in a master-slave system which includes a cylinder on each side of the vehicle 10, i.e., one cylinder steers the left wheel and the other steers the right wheel. These cylinders 46 are in a series so that oil trapped between the two acts in place of a conventional tie rod as a sort of fluid tie rod. The cylinders are "phased" in that they stroke at the same rate and are timed to each other. The volume of oil in between the two cylinders is constantly maintained. The location of steering system 23a assures that the vehicle 10 has a crop clearance of at least about 6' as illustrated in FIG. 4. This in turn allows the vehicle 10 to move through mature rows of crops, specifically corn, without damaging the crops by having the steering arm 23 and steering cylinder 46 repeatedly hit them. For example, if a valued crop such as seed corn becomes infested or contaminated in late season the inventive high clearance vehicle 10 will allow the operator to apply the necessary insecticide or herbicide to the crop which may be nearly 6' tall in the late season.

Figure 17:
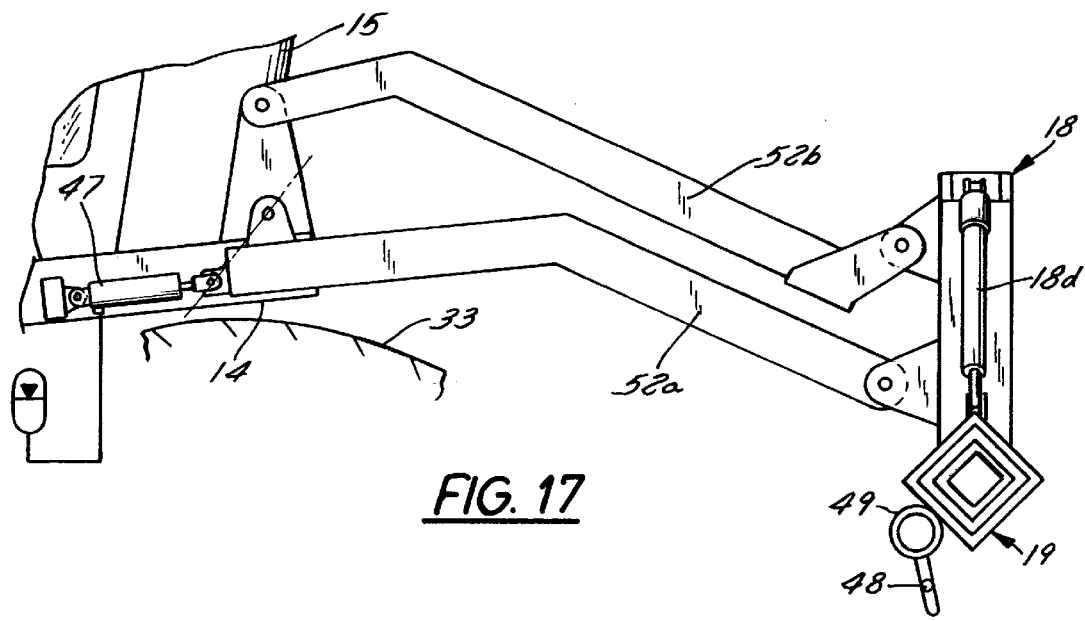
FIG. 17 is a sectional side elevational view of a boom for the vehicle of FIG. 1.
Figure 18:
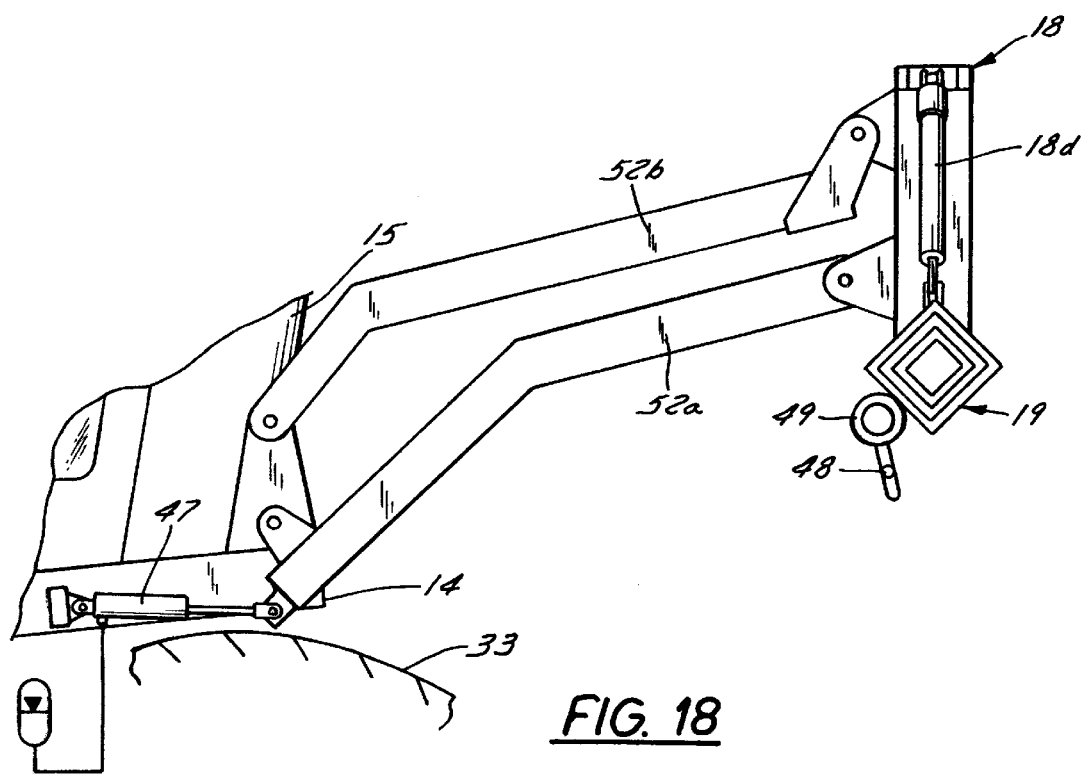
FIG. 18 is a side elevational view of the boom of FIG. 17 in a raised position.

As seen in FIG. 1, the vehicle 10 may have boom extension arms 19 which allow the boom 18 to extend outwardly 60, 75, 80, or 90 feet. Boom 18 may also be adjusted in height from 18" to 108" for various crop applications by use of an elastic member 47. As best seen in FIGS. 17 and 18, connected to the frame 14 is also a boom lower lift arm 52a and an upper lift arm 52b. The lower lift arm 52a and the upper lift arm 52b carry the boom which is rotatably connected to at least one lift arm. Boom elastic member 47 is connected to the lower lift arm 52a for supporting the weight of the boom thus making it a falling rate suspension.

This system of a falling rate suspension, as shown in FIGS. 17 and 18, provides full float to entire boom 18 with isolated cushioning for each arm 19. This boom suspension system protects boom 18 from vertical shock, and minimizes boom whip. Boom 18 may have a series of nozzles 48 and hoses 49 attached which allow for the spraying of various liquids and solids including fertilizers, pesticides and herbicides as shown in FIG. 5. Each boom extension arm 19 can be folded inwardly toward main frame 14 for easier moving during transport (not shown). The boom extension arms 19 may be connected to the boom 18 with elastic members 19a which provide further cushioning to the boom arms 19. The present invention also may be equipped a Raven SCS 460 spray control system with radar and may be compatible with a variety of Global Position Satellite (GPS) systems for more precise spray application.

Figure 18A:
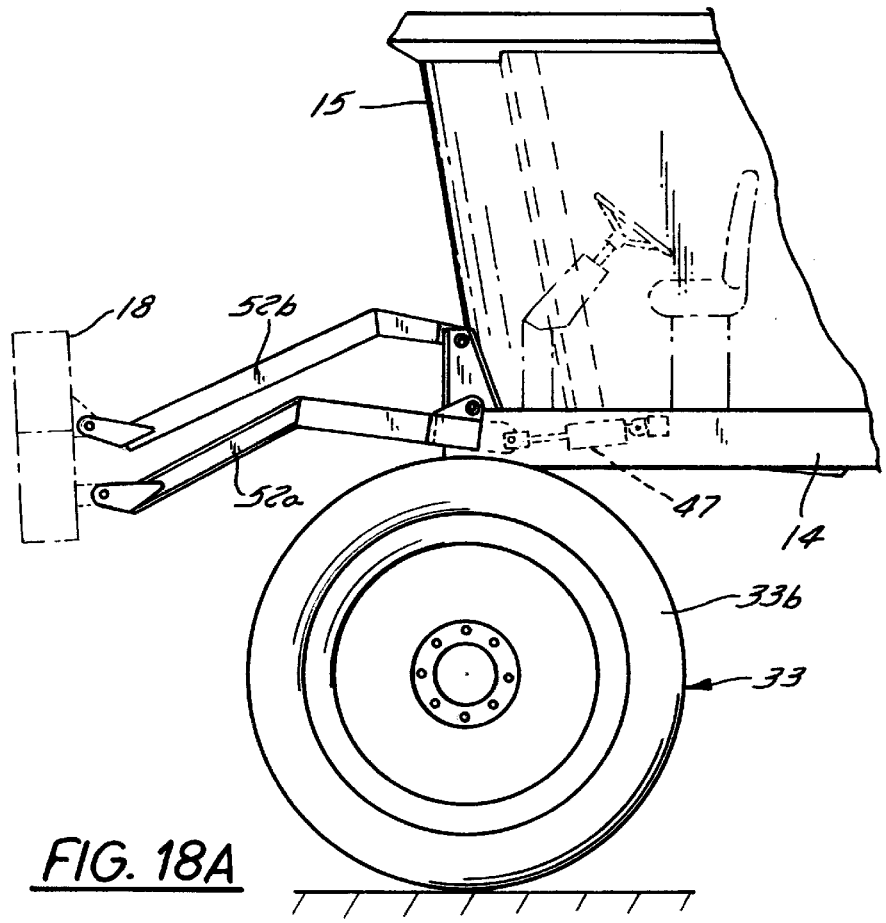
FIG. 18A is a partial side elevational view of the vehicle of FIG. 1.
Figure 18B:
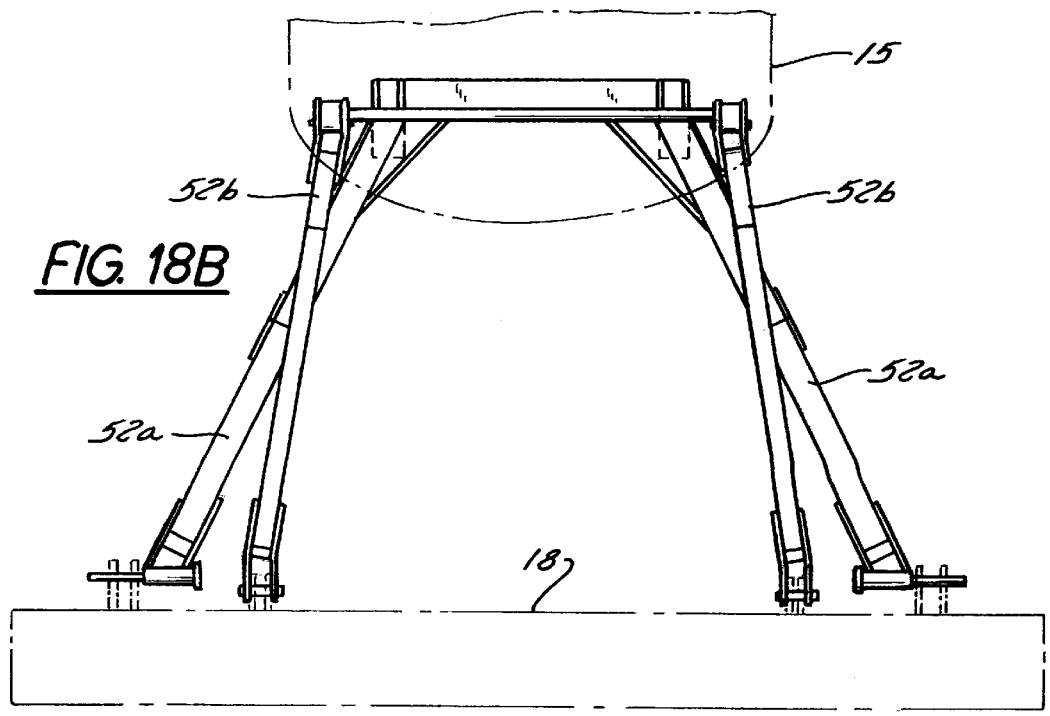
FIG. 18B is a top view of the boom of FIG. 17.

FIG. 18B shows a top view of the lift arms 52a and 52b. Preferably, the lift arms 52a and 52b have an X-shaped configuration as shown for added structural support. The lower lift arms 52a are attached by a yoke-type weldment. The unique configuration of the lift arms 52a, 52b allows the boom 18, lift arms 52a, 52b, and the extension arms 19 to manage the great stresses and strains they experience when traveling over rough terrain. Further, lift arms 52a, 52b are set off from cab 15 at an angle for greater operator visibility. As best shown in FIG. 18A, the arms 52a, 52b are also slightly curved for greater clearance of the tires 33b. The arm 52a, 52b are set off at outward angles around the tires 33b as well.

Figure 18C:
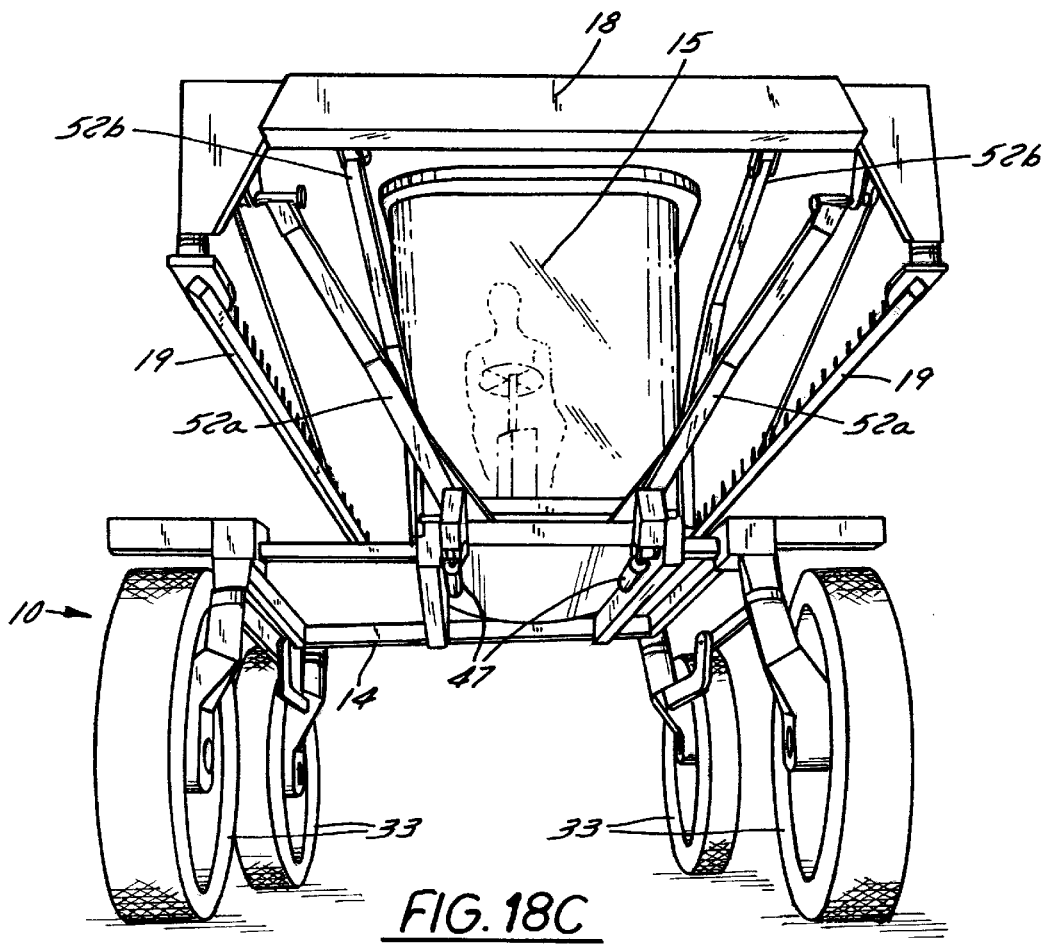
FIG. 18C is a front elevational view of the vehicle of FIG. 1 showing the boom in a raised position.

FIG. 18C shows the generally n-shaped boom 18 with the extension arms 19 folded up and high enough so that an operator (in shadow) can look under it when sitting in the cab 15 and can look straight ahead to the horizon and not experience any obstructions in view. This is important because the operator needs to be able to look from the head liner of the cab 15 right down to the floor board and see road when in transport without obstructions. The lift arms 52a, 52b and the lift arm cylinders 47 mounted under the cab 15 are also configured to minimize obstruction to the operator's view.

Figure 18D:
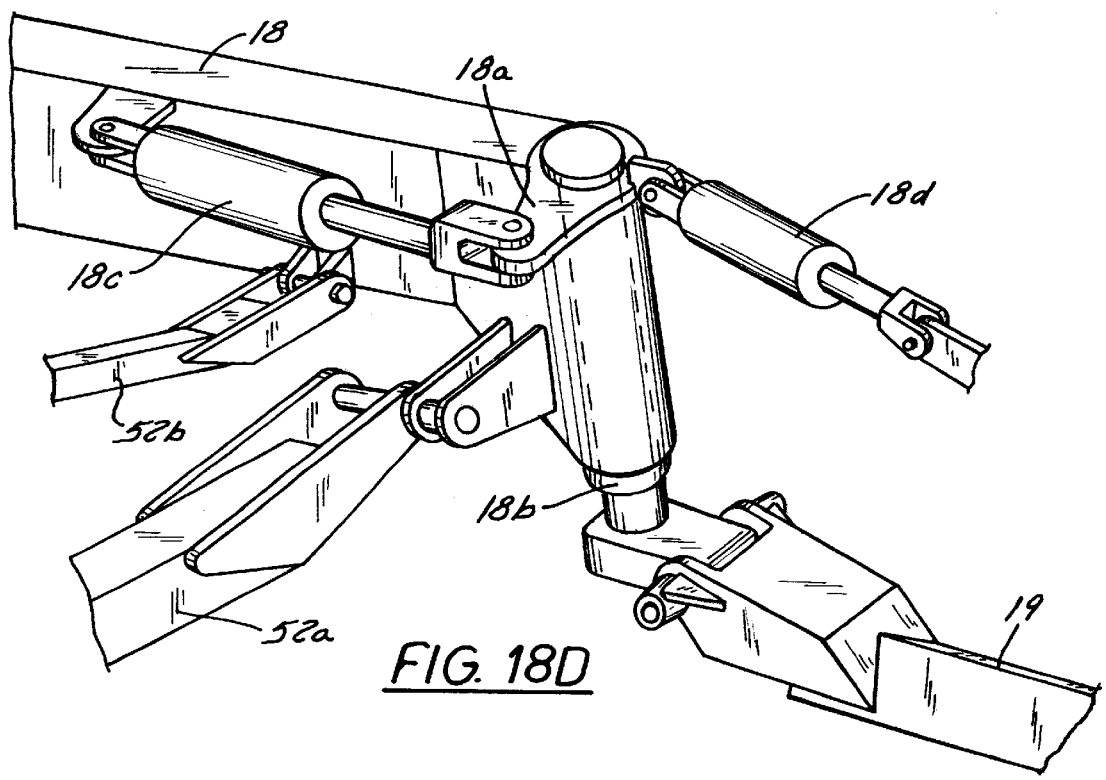
FIG. 18D is a magnified view of a section of the boom of FIG. 17.

As shown in FIG. 18D, the boom 18 of the present invention uses a torque tube configuration including a torque arm 18a, a sleeve tube assembly 18b having a shaft rotatably connected to the boom, and a fold cylinder 18c connected to the top of the boom 18 and arm 18a. A tilt cylinder 18d connects the arm 18a to extension arm 19. Thus it is possible that the boom 18 can wind up with torque and still have some cushioning for and aft. For example, when the operator must slam on the brakes of the vehicle 10, the boom 18 can sway for and aft with kind of a sponge torsion bar type flex.

The boom 18 and the arms 19 have two effective folded position, due to the two positions of the saddle. One position, is for very narrow transport, like when traveling on a semi trailer for transport across the country. The second position allows for more convenience for the operator. For example, when arm 19 is folded up on the left side, in the narrow position, it is directly over a deck that the operator walks along to get from a ladder to the cab 15 making it difficult to service the machine 10. This second fold position was added allows the operator to move along the deck with ease. Nevertheless, in situations where the vehicle needs to be narrow, the operator then just moves the arm 19 to the first position.

Figure 18E:
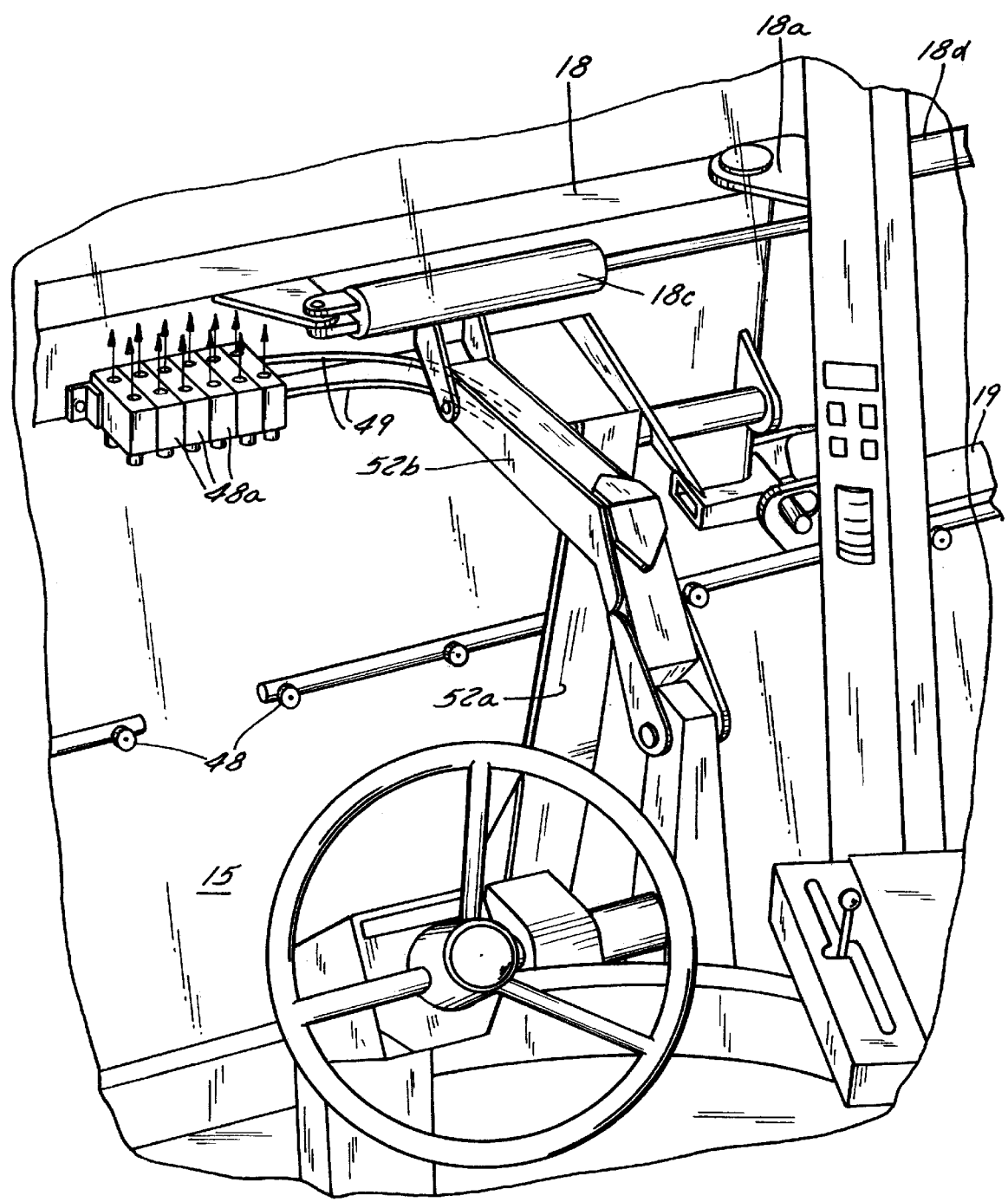
FIG. 18E is view of the boom of FIG. 17 from inside the cab of the vehicle of FIG. 1.

As best illustrated in FIG. 18E, the boom 18 is designed so that all of the complexity of the valves 48a are mounted directly on the boom 18 itself, so that there is a minimum of connections between the boom 18 and the main frame 14. Thus, the boom 18 is detached, the hoses 49 do not need to be detached. With this configuration, there are fewer hoses and connections to make because of the way the plumbing is set up. For example, a hook and catch mechanism may be used. Moreover, the configuration of the lift arms 52a, 52b and boom 18 increases the operator's visibility as shown in FIG. 18E. For example, when driving through the field, the operator looks down the center lines of the lift arms 52a, 52b rather than looking at the side of them because the arms are angled to be in line with the operator's line of sight.

Each boom extension arm 19 has a primary member 19a and secondary member 19b as best seen in FIG. 1. The two are connected by a simple hinge that folds back over itself, like a door hinge. The primary member 19a is the longer member. The secondary member 19b actually folds over member 19a when a fold cylinder 19c is actuated to fold the boom 180 degrees. The cylinder 19c is a direct acting cylinder, like on the steering element, but that steering only moves about 90 degrees. Because it is difficult to get a linear fold cylinder to rotate 180 degrees, prior art systems do it with a linkage, much like, a back hoe linkage which has a bucket and a set of four bar or non-parallel links so that the cylinder actuates the links to makes the bucket rotate 180 degrees. In the preferred embodiment, the fold cylinder 19c has independent hydraulic control. The hydraulic cylinder 19c is directly attached to the primary member 19a and the secondary member 19b with the pin. No linkage is necessary. To achieve a 180 degree fold the secondary member 19b passes over center and then the cylinder 19c is retracted. During this process, the secondary member 19b actually goes up in the air, and then back down again when it goes through this motion to get a gravitional assist. When completely folded, the cylinder 19c is fully collapsed and when the cylinder extends to full length, the member 19b only moves 90 degrees. At that point, the cylinder 19c is goes over center and passes through a pivot point on the boom hinge. Then cylinder 19c collapses to unfold the arm 19 the remaining 90 degrees. The operator must reverse the motion of the cylinder 19c by a switch in the cab 15 at that point and re-collapse the cylinder settle the arm 19 down into the open, operating position. In both the operating position and the folded position, the cylinder is collapsed.

The present invention thus eliminates the linkage and keeps the system simple, although it requires the operator to reverse the switch halfway through the motion. This boom fold mechanism is also lighter which is important because the boom may be 90 feet long or a 120 feet long. In this case, weight is extremely critical to add on the end of the boom. When the boom is 90 feet long with 45 feet sticking out from the center of the machine, the boom acts like a whip. For example, to make a good long bull whip of one continuous length of leather, several segments must be stitched together. However, such a whip normally breaks at the segment because that connection point is weaker the rest of the naturally continuous leather. Because the arms 19 are the segmented so that they can fold, there must also segments stitched together. It important to eliminates weaknesses, complexity and parts to have as few segments stitched together as possible.

As shown in FIG. 3, engine 17 may be supplied by any engine manufacturer. Typically, the engine is sized to propel vehicle 10 to travel at speeds of about 30 miles per hour or more. Nevertheless, in one preferred embodiment, the engine consists of a 1997 model Cummins®, 200 horse power 6-cylinder turbo, after-cooled, diesel engine. The engine also provides power to a hydrostatic drive. The hydro-static drive has at least one pump (not shown) which drives 1997 model Poclain(® narrow profiled wheel drive assemblies 32 located at each leg 20, 38 to provide full time four wheel drive to the vehicle 10, as seen in FIG. 5.

As best seen in FIG. 3, the cab 15 may be of any variety which will provide maximum comfort, view and control to the driver. However, cab 15 in one embodiment is preferably a 1997 model John Deere® 90 Series® cab. The John Deere 90 Series(® cab provides a more spacious cab with a fully adjustable air suspension seat, fold up arm rest. a large door for easy access, a tilt/telescoping wheel, air conditioning, and optimum control placement. Further, the wrap around windshield of cab 15 provides a full, unobstructed, panoramic view in both field and transport positions. Moreover, because cab 15 is located directly behind the boom 18, the operator has a direct line of sight to generally every nozzle 48 and thus allows the operator to recognize and react to changing conditions. This results in less operator fatigue, more efficient spraying, better application, and more acres covered per day.

The wheels 33 may be supplied with generally any sized tall tire, e.g. six foot, which will allow the vehicle to operate in narrow rows or wet fields. For example, wider or floater tires 33b may be used to allow the vehicle 10 added traction in wet fields in the early spring. However, in the late summer when the crops are nearly mature, narrower tires are necessary to prevent extensive damage to the crops as the vehicle 10 moves through the field. Further, the big, fat floater tire helps to keep the ground pressure down so that the vehicle's tires 33b do not crush any young seedlings or seeds which have been recently planted.

Figure 13:
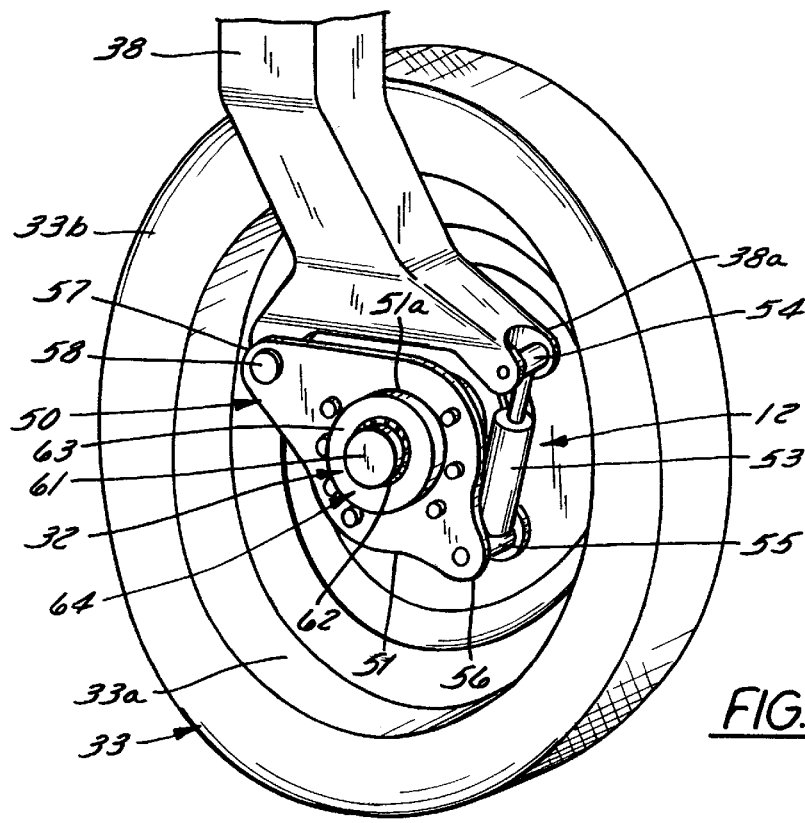
FIG. 13 is a partial perspective view of an alternate independent suspension for the vehicle of FIG. 1.
Figure 14:
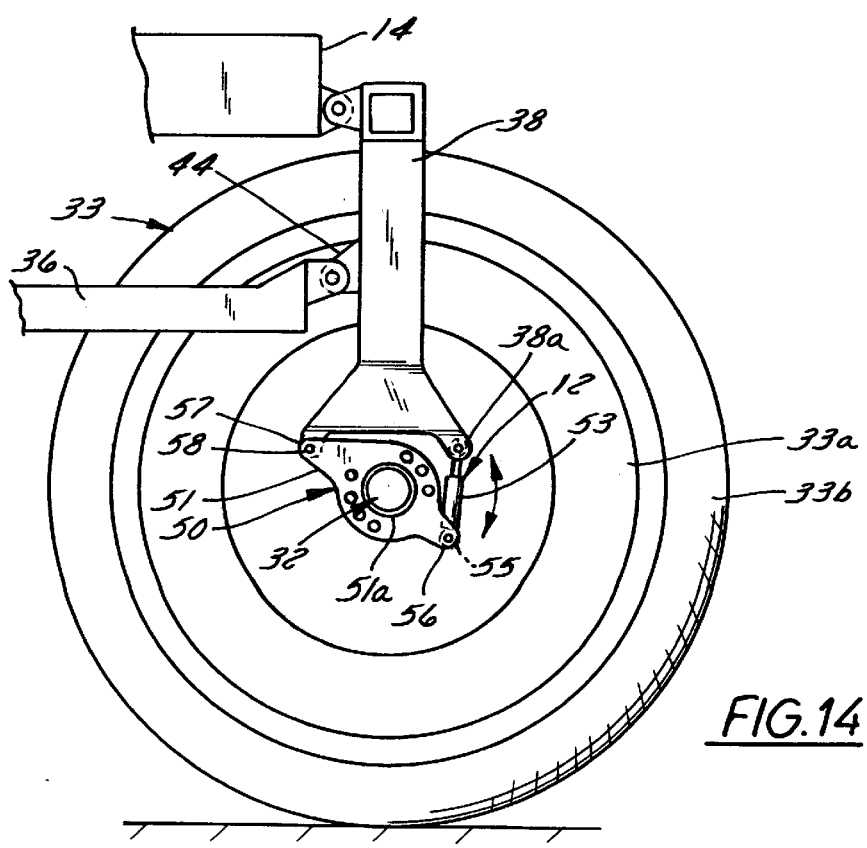
FIG. 14 is a partial side elevational view of the independent suspension of FIG. 13.

Referring to FIGS. 13 and 14, independent suspension 12 may also consist of a knee action suspension 50. Knee action suspension 50 may be confined within the inside of the wheel rim 33a. The knee action suspension may consist of a hub swing arm 51 which is connected to either a rear leg 38 or front leg 20. The hub swing arm 51 may be connected to the leg 38 by an elastic member 53 which is connected between the leg 38 and the hub swing arm 51. Preferably, leg 38 has ears 38a for receiving first end 54 of elastic member 53. Opposite first end 54 of elastic member 53 is second end 55 which connects to ears 56 which protrude from hub swing arm 51. Hub swing arm 51 is also connected to leg 38 at knee joint 57. Knee joint 57 includes at least one pin 58 which connects to at least one ear 56 on the swing arm and at least one ear 56 on leg 38.

Referring to FIG. 13, hub swing arm 51 has hole 51a within it for receiving wheel drive assembly 32. Wheel drive assembly 32 includes an axle 61, a bearing 62. a hub 63 and a drive mechanism 64. Preferably, the drive mechanism 64 is a low-speed high torque wheel motor, such as the 1997 model produced by Poclain®. Wheel drive assembly 32 is connected to arm 51 to provide power to wheels 33.

Figure 15:
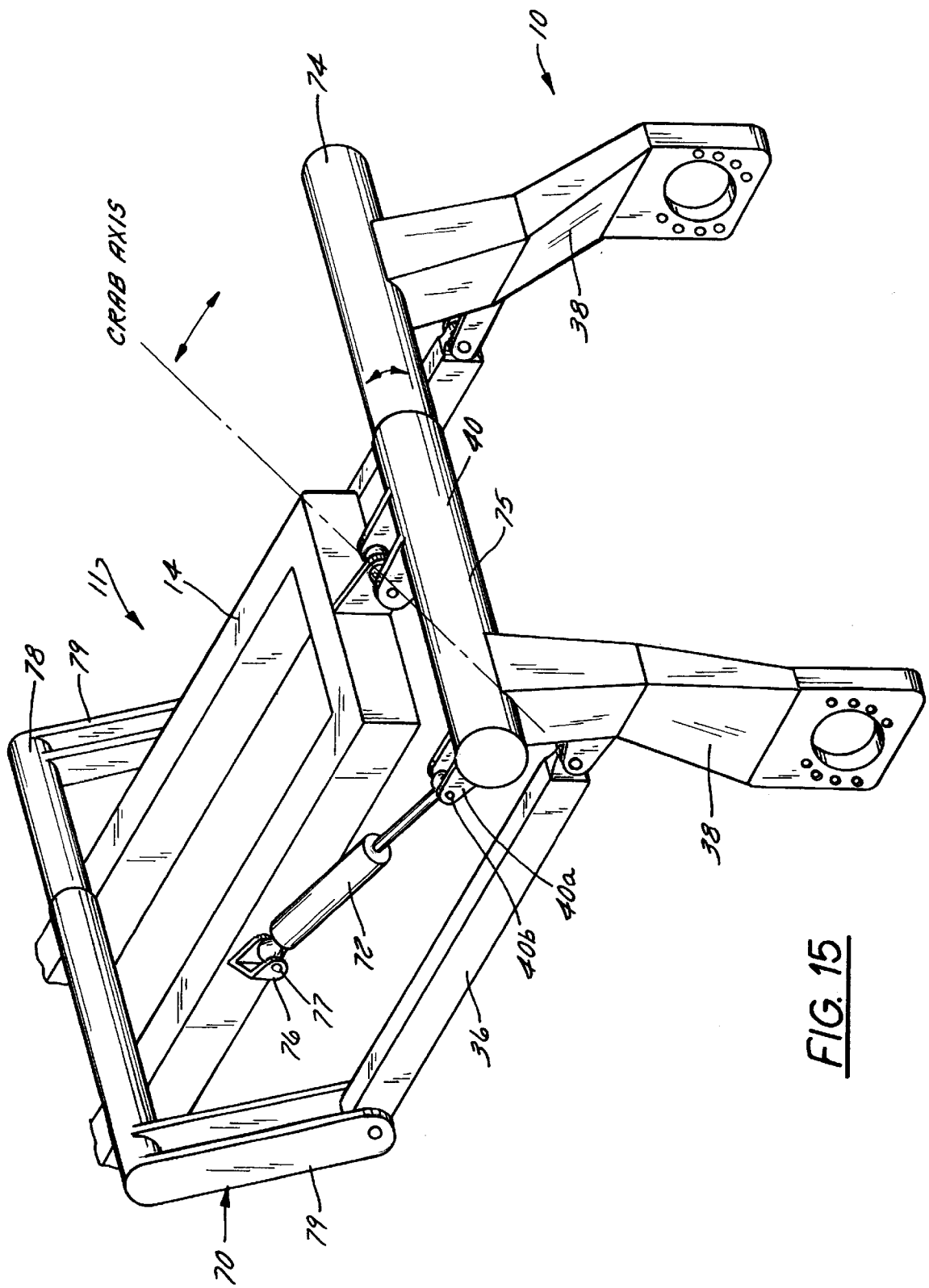
FIG. 15 is a partial perspective view of the rear portion of the vehicle shown in FIG. 1 showing an alternative embodiment of a rear axle.
Figure 16:
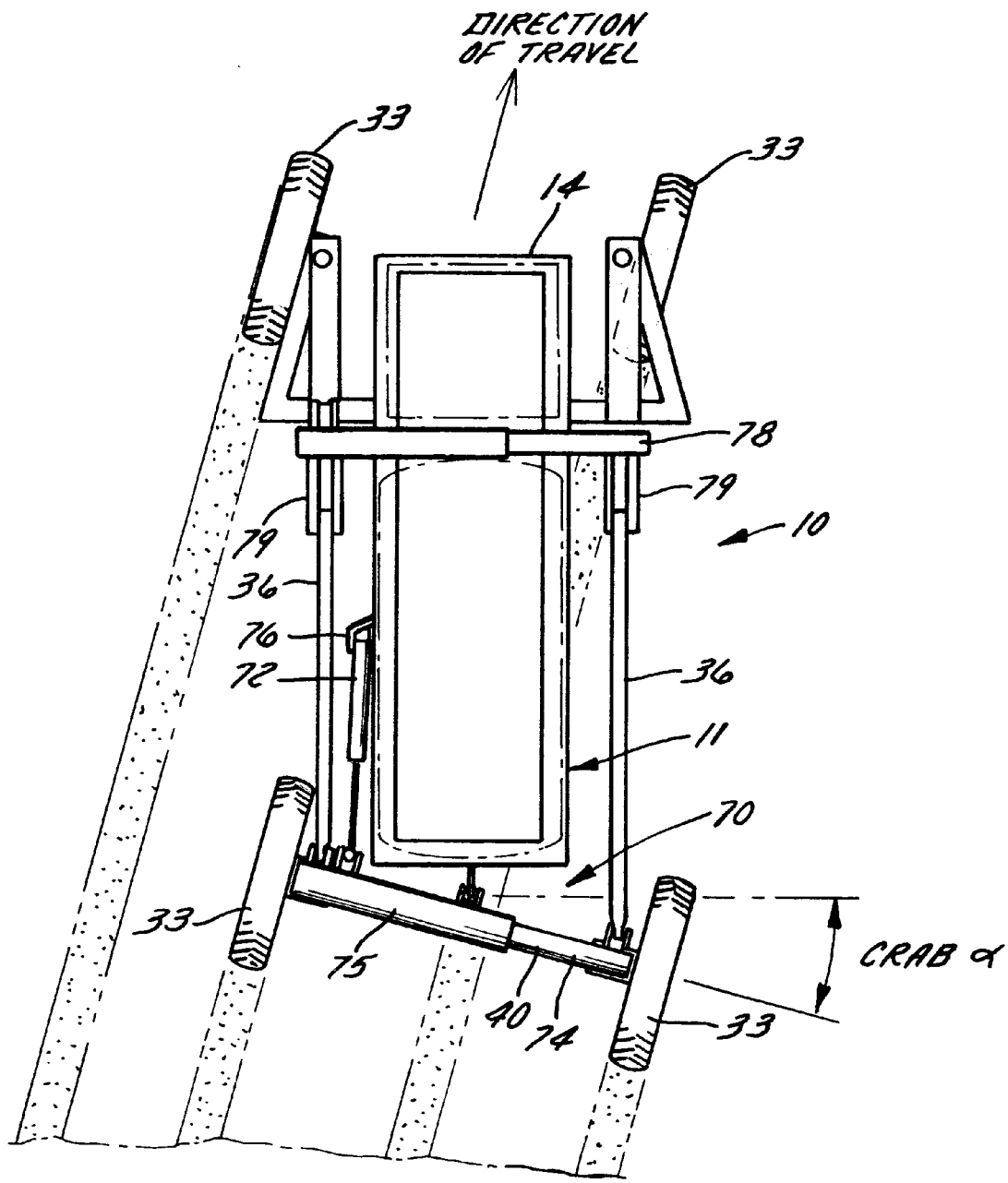
FIG. 16 is a schematic top plan view showing the structure of FIG. 15 in use in a field.

In an alternate embodiment shown in FIGS. 15 and 16. the walking beam frame 11 may include a crab steering device 70 which acts in cooperation with the beam frame 11. The crab steering device 70 includes actuating member 72 mounted to rear axle 40. Telescoping rear axle 40 in this embodiment includes two round tubular members 74 and 75. The round tubular telescoping rear axle members 74, 75 allow rotation of the round tubular members as the frame 11 oscillates. By extending the actuating member 72, the rear axle 40 is shifted off-center so that the rear wheels "crab" or "dog leg". The actuating member 72 may be attached to either the right or the left side of the main frame 14 to allow the vehicle 10 to track left, track right, or track both left or right. Again, ears 76 and pins 77 may secure the elastic member 72 to the main frame 14 and the ears 40a and pins 40b help secure it on the telescoping rear axle 40. An additional round tubular member 78 connected to the leg braces 36 by arms 79 to complete the structure of the crab steering device 70.

The crab steering device 70 has several advantageous features. For example, in a field with a solid seeded crop such as wheat where there are no rows for the vehicle 10 to ride between, the wheels of vehicle 10 must drive over the plants. Some studies suggest that individual plants will recover faster if only driven over by one tire rather than both the back and the front tire. Although some prior art vehicles can widen the rear wheels independent of the front wheels to prevent this from happening, this can take a considerable amount of time. With the crab steering device 70 of the present invention, one merely needs to actuate the second elastic member 72 to engage the crab steering device 70 to follow a less destructive wheel 33 track as illustrated in FIG. 16. This device 70 is also useful during hillside plowing to maintain vehicle stability.

Figure 19:
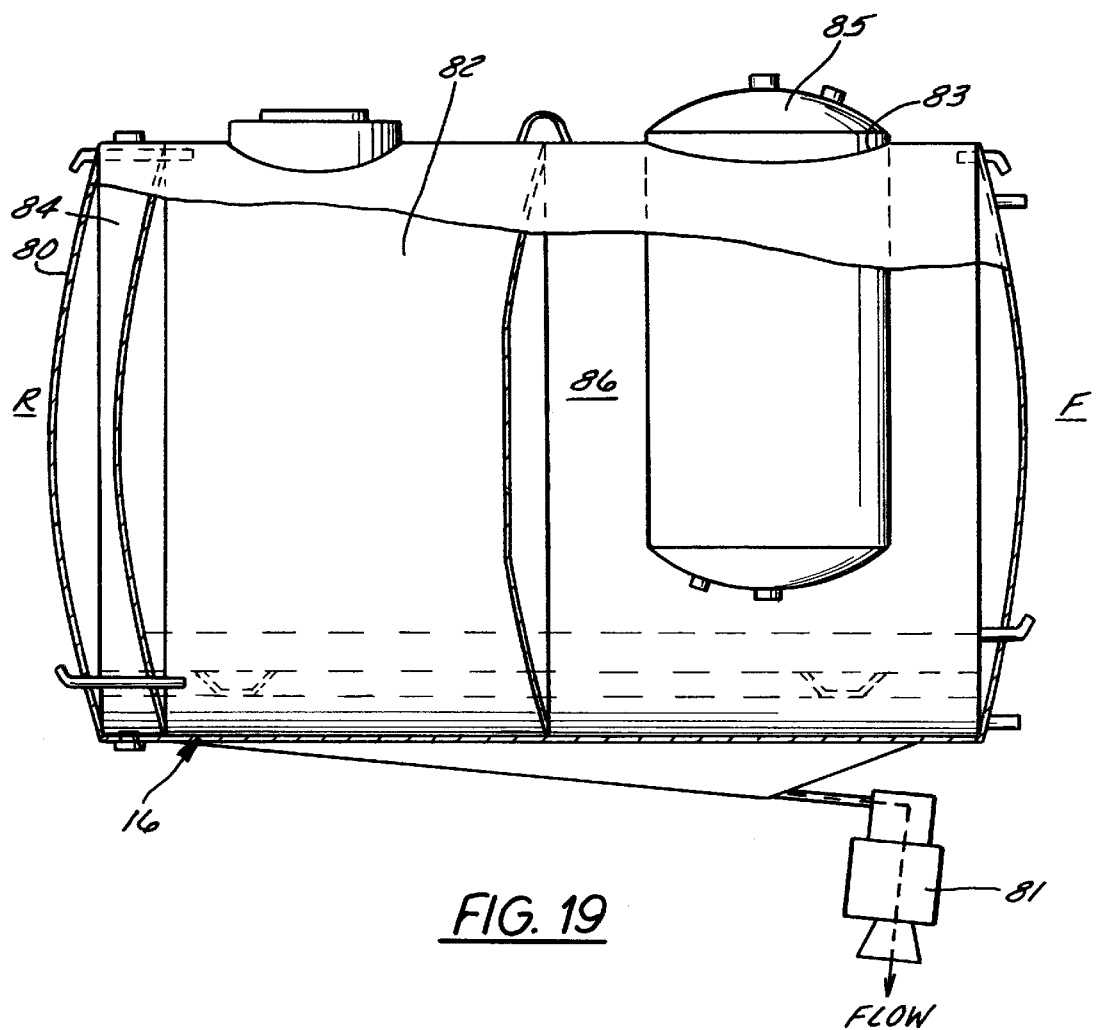
FIG. 19 is a sectional view with portions broken away of a tank for the vehicle of FIG. 1.

Tank 16 is essentially comprised of large main tank or shell 80 best seen in FIG. 19. A bulkhead is inserted into this main shell 80 and splits the shell 80 into at least two compartments 82, 84. The larger compartment 82 is for the product which is to be sprayed and the smaller compartment 84 is for fresh water to rinse the compartments 82, 84 and the shell 80 after the application of the product is completed. There is a hole 83 in the top of the main shell to allow a smaller cylindrical tank 85 to be dropped within the shell 80. The small cylindrical tank 85 makes a third compartment 86 that is designed to be pressurized. This pressurized compartment 86 may contain marker fluid which is generally in the form of a foam producing soap. The use of this marker fluid allows the operator to determine what portion of the field he has already covered with product.

Conventional sprayers and more particularly row crop sprayers generally have at least two liquid transport means and sometime three or more. A primary tank of the largest capacity generally carries product in the form of water and fertilizer/concentrate intended to be applied on the field surface or plant growth. Additionally, many machines carry a smaller tank of clean water to flush or rinse the primary tank and application system of pumps, valves, nozzles, etc. Additionally, many machines carry another smaller tank of foamer to mark the sprayer's path as the sprayer traverses the field. This enables the operator to distinguish where to travel on repeated trips across the field. The present invention's tank design helps simplify manufacture and reduce cost and provides a system which is easy to maintain and clean, has a longer life expectancy, and has a silhouetted profile which is pleasing to the eye.

The present invention is easier to maintain particularly where a lot of chemicals are being used. For example, the EPA is adamant about keeping the machines clean. The EPA expects every bit of that chemical to end up on that field. Thus, if there is over spray on the outside of the machine, the EPA wants it rinsed off and makes sure that the rinse agent and chemical wind up in that field. Further, the EPA often insists that the inside of the tank is rinsed out before the machine goes to the next field.

To meet stringent EPA cleaning requirements, most conventional machines have a high pressure washer or wand similar to those at a car wash. Washing one smooth tank, like the tank 16 of the present invention, versus a multiple of surfaces therefore is easier and less problematic as will be described in greater detail.

Many benefits follow from having one main shell 80 with several individual compartments 82, 84, and 86. First, there are fewer parts and fewer surfaces to clean or be concerned about for safety reasons. Second, the hose connections and circuits leading to the compartments are greatly simplified because they can be more direct. Finally, having rinse water allows the operator to change product chemicals in the field which can be very important for regulatory reasons. If the operator can wash and clean the residual chemicals from the equipment, the operator has a better chance of meeting the regulatory requirements before he leaves the field. If vehicle 10 can be washed and cleaned more easily, the operator can cover more ground, and thus maximize the value of vehicle 10. Further, the operator only needs to plumb basically one tank 80 when he wishes to determine how much product, rinse and marker foam remain. Tank 16 is preferably fabricated from stainless steel although any suitable rigid material, such as polyethylene, may suffice.

As shown in shadow in FIG. 19, product pump 81 is mounted generally forward and substantially lower than conventional systems for better flow characteristics. The impeller shaft of the pump 81 is generally vertical. This provides a slow distribution into the pump 81 and minimizes air entrapment and increases pump efficiency and gain. Because the pump 81 is mounted forward rather than toward the rear of the machine 10 and the boom 18 is on the front and the tank 16, the shortest distance for the product to flow is optimized. This eliminates additional crooks and fittings in the flow circuit and maximizes gravity flow from the tank to the pump so there is little chance of air loss. Product flows from the pump thru the drop tunnel, then out the outlet of the pump where it is directed forward and straight toward the boom.

Referring to FIGS. 20–25, the high clearance vehicle 10 of the present invention has hinge stacked assembly 92 which includes a self-rotating screen 93. The hinged stack assembly has swing out cooler cores which include air conditioning condenser 94, oil cooler 96, and engine radiator 97. Door 99, which has a hole 99a in it to receive the cylindrical self-cleaning. screen 93, covers the stacked assembly 92. A plastic cover 100 covers the screen 93. Within this cylindrical screen 93 is at least one fan blade 101 for drawing air through the screen 93.

Figure 23:
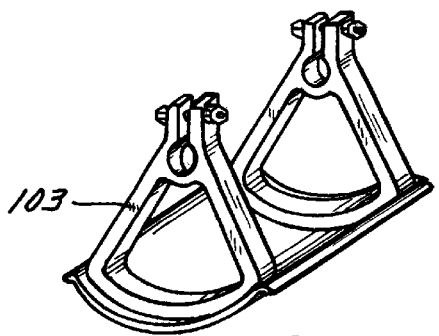
FIG. 23 is a perspective view of a baffle for the vehicle of FIG. 1.
Figure 22:
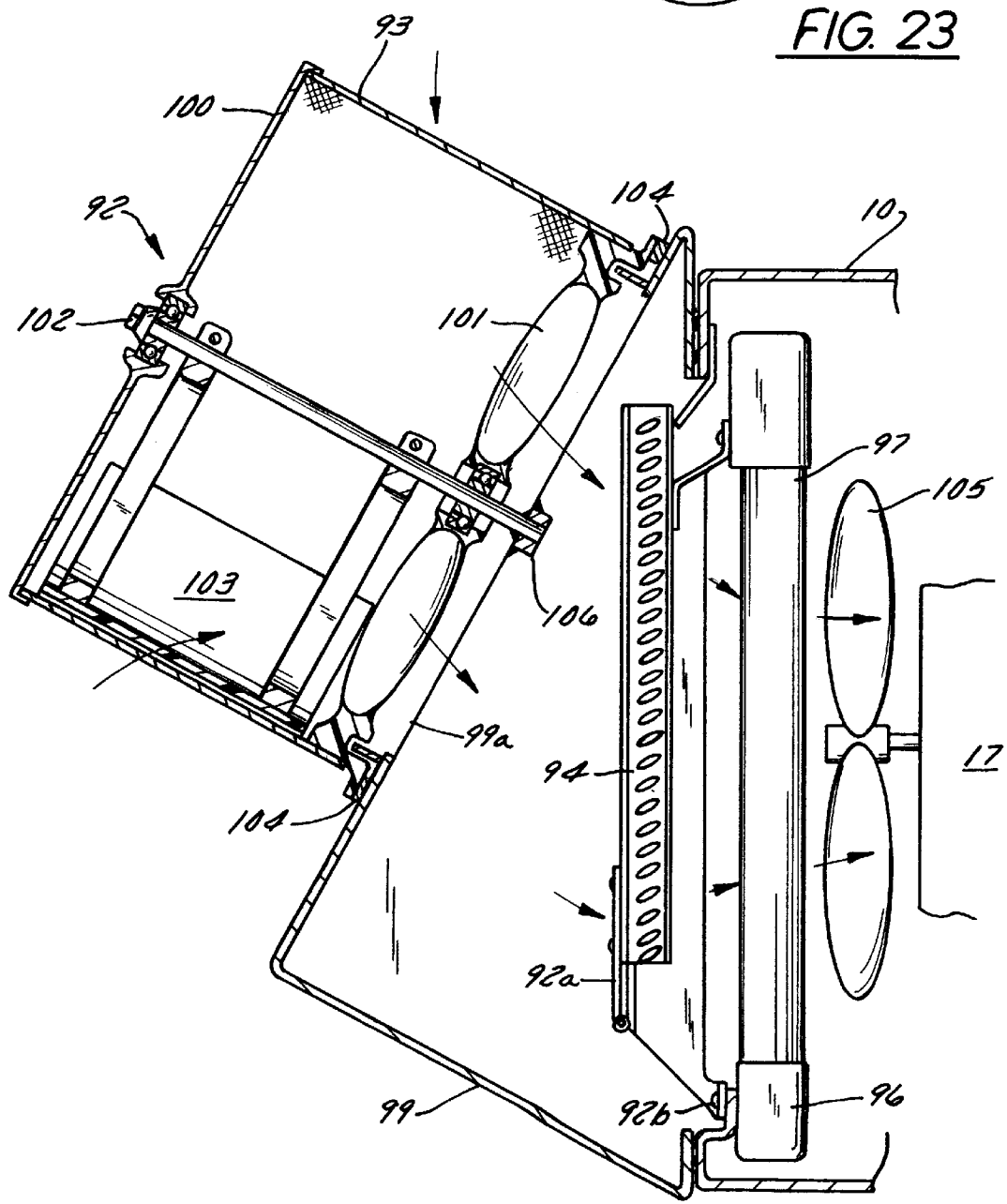
FIG. 22 is a partial sectional view of a rear portion of the vehicle of FIG. 1.
Figure 24:
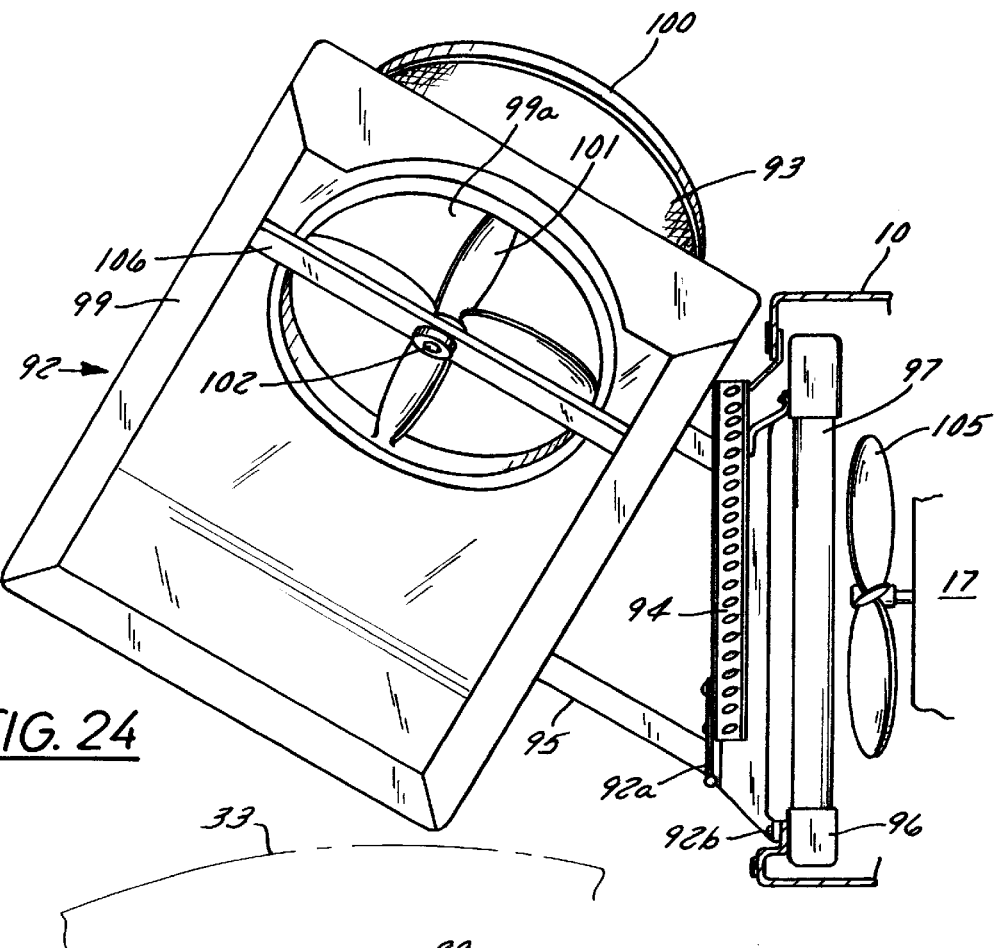
FIG. 24 is a perspective view with portions broken away of the structure shown in FIG. 22.

Referring to FIGS. 22 and 23, an axle 102 is connected to the fan blades 101. The axle 102 is also connected to the plastic cover 100 at one end and a tubular support 106 at the other end. The axle 102 rotates along with the fan blade 101 and the cover to drive the cylindrical screen 93. Brush seals 104 fit between the outer edge of the cylindrical screen 93 and the door 99 to allow for nearly frictionless movement of the screen. Baffles 103 fit within the cylindrical screen 93 and around the axle 102. The baffles 103 preferably do not move.

An engine powered radiator fan 105 creates a vacuum through the radiator 97, oil cooler 96 and air conditioning condenser 94. This vacuum sucks air from outside the cylinder 93 through the screen 93 rotating the fan blades 101 and the cylindrical screen 93. The vacuum sucks airborne debris and chaff to the rotating screen 93. As the rotating screen 93 passes the baffles 103, the vacuum is cut off and the chaff and other debris drops away from vehicle 10 due to the forces of gravity acting upon it. Thus, screen 93 is cleaned for its next revolution. The unhindered flow of fresh air to the engine 17 and the air conditioning condenser 95, oil cooler 96 and radiator 97 is important in that it prevents these systems from overheating. Because the rotating cylindrical screen 93 eliminates trash build-up, the vehicle 10 is especially useful in no-till conditions, seed operations, and late post-season work.

Some alternative systems (not shown) use vacuum from engine powered radiator fan 105 to help gravity suck the leaves off of the screen. Dirt returns to the air but is routed around the oil cooler 96, radiator 97, and air conditioning condenser 95 where it drops to the ground.

The self-cleaning cylindrical screen 93 allows the high clearance vehicle 10 to operate under generally any seasonal condition by ensuring that the flow of air to the engine 19, radiator 97, condenser 94, and hydraulic oil cooler 96 remains constant. For example, during the wet spring months the self-cleaning cylindrical screen 93 keeps mud and other dirt from clogging up the air flow. At harvest time, the cylindrical screen 93 keeps dust and other flying debris from cutting off the air flow.

Figure 20:
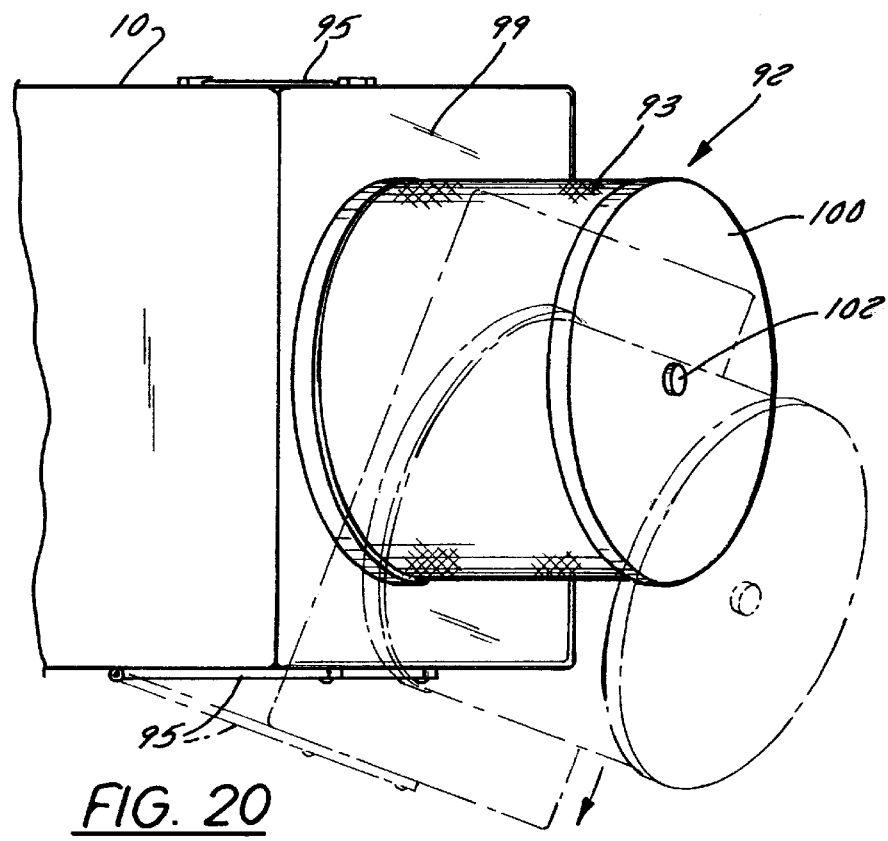
FIG. 20 is a partial perspective view of a screen for the vehicle of FIG. 1.
Figure 21:
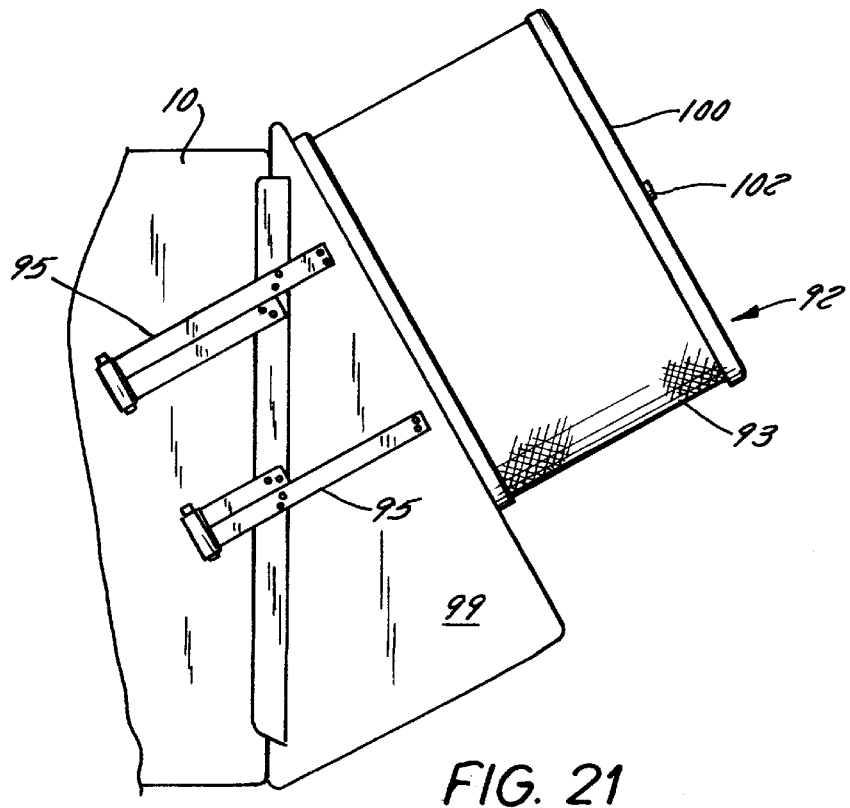
FIG. 21 is a side elevational view of the screen of FIG. 20.
Figure 25:
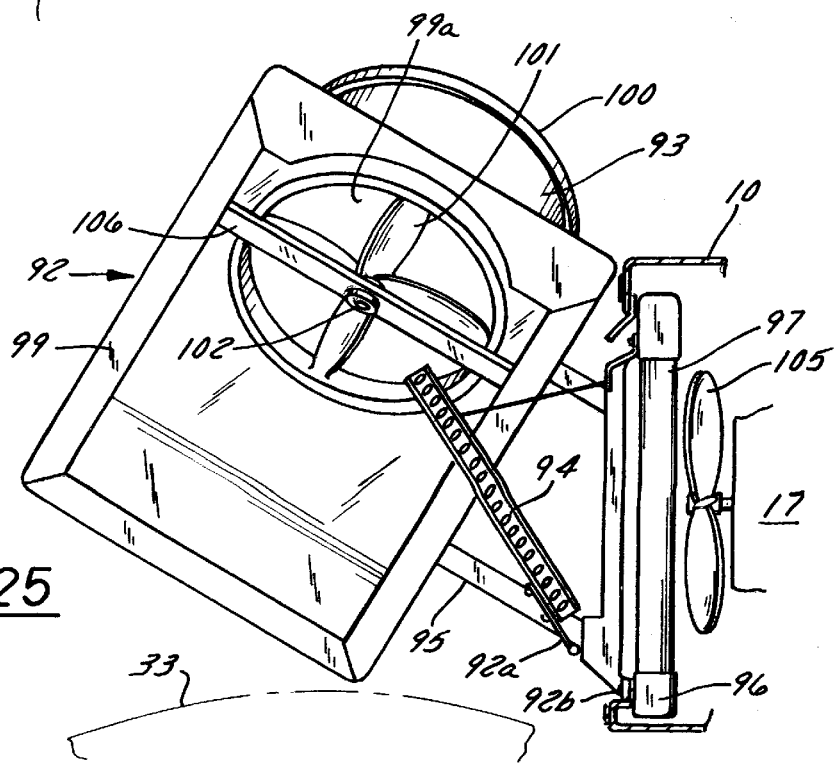
FIG. 25 is a perspective view of the structure shown in FIG. 22 showing an air-conditioner condenser removed from a stacked assembly for the vehicle of FIG. 1.

Air conditioning condenser 94, the oil cooler 96, the radiator 97 and the door 99 each pivot on angled hinges. As shown in FIGS. 20 and 21, an angled hinge 92 allows the door to be opened away from the vehicle and the rear tire so that the air conditioning condenser 95, oil cooler 96 and radiator 97 are as easily accessible to maintenance as necessary. As best shown in FIG. 25, the air conditioning condenser 95 is also movable on an angled hinge 92a so that it can be pulled away from the oil cooler 96 if the oil cooler needs maintenance. Finally, the oil cooler 96 is also on an angled hinge 92b so that it can be moved away from the radiator 97 if maintenance needs to be performed on the radiator 97 alone.

The vehicle 10 may further comprise a contoured engine cover side panel including an air spring for easy access to an engine 17. The vehicle 10 may also have an engine exhaust system directed toward the outside away from the vehicle and passing through the engine cover side panel.

The present invention's combination of the walking beam frame 11 and independent suspension 12 provides a significant advantage over existing high clearance vehicles. Moreover, the independent suspension 12 can be accomplished in any of several ways. For example, by an A-shaped frame 24 and a leg brace 36 acting with an elastic member 37, or a knee action suspension 50 acting in conjunction with an elastic member 53. As one skilled in the art would be aware, nearly any combination of a walking beam with an accumulator and an actuator may suffice. Some alternate embodiments of the present invention are schematically illustrated in FIGS. 26–35.

Figure 26:
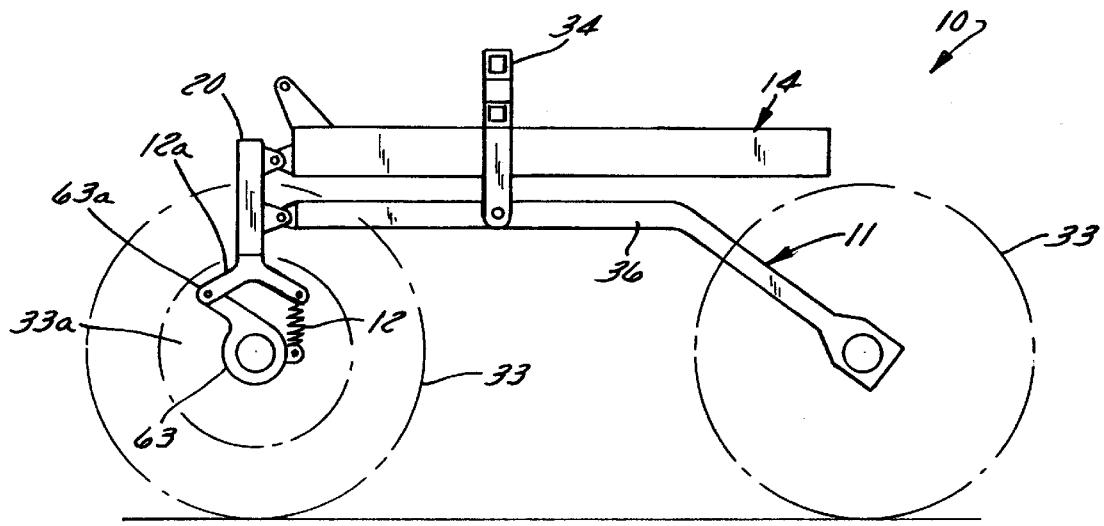
FIGS. 26–35 are schematic side elevational views of alternate embodiments of the walking beam frame and independent suspension of the vehicle of FIG. 1.

FIG. 26 shows another embodiment of walking beam frame 11 and independent suspension 12. In this embodiment, a Y-shaped member 12a is rotatably connection to front leg 20. One arm of the Y-shaped member 12a is connected to a hub 63 at a pivot point 63a. A second arm of the Y-shaped member is connected to the upper end of the independent suspension 12 which this case is a spring. A lower end of the spring 12 is connected to hub 63. Leg 20 is pivotally connected to main frame 14 at an upper pivot point and a generally C-shaped leg brace 36 at a lower pivot point. Main truss 34 is welded to the main frame 14 and connected at a pivot point to leg brace 36. The independent suspension 12 is generally contained within rim 33a of wheel 33 in this embodiment.

Figure 27:
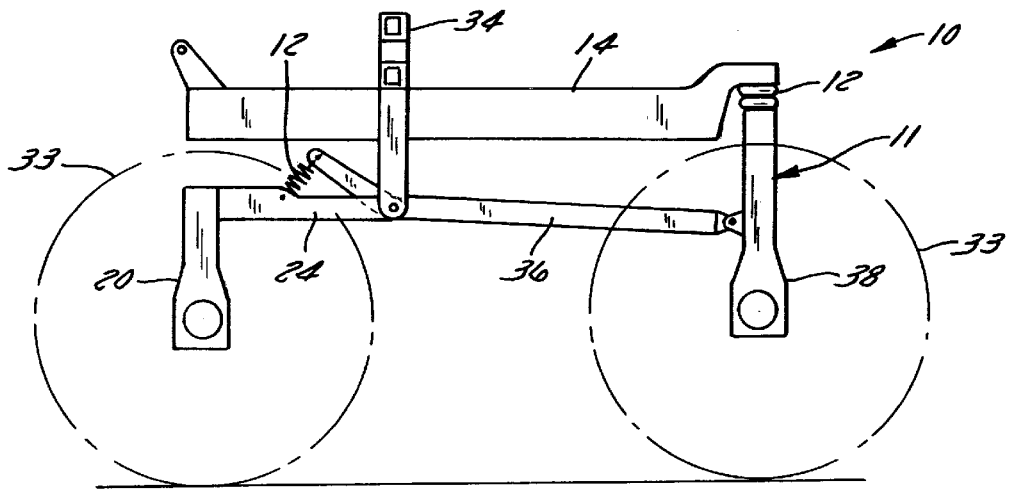

FIG. 27 shows yet another embodiment of the present invention. In this embodiment, independent suspension 12 is provided to the walking beam 11 at two points. At the first point, the independent suspension 12 may be comprised of a spring. The spring is connected at an upper point to a bent portion of leg brace 36. At a lower end, the spring is connected to swing arm 24 which is pivotally connected to the leg brace 36 just below the bent portion. Rear leg 38 is pivotally connected to leg brace 36. At one end of rear leg 38 is another independent suspension 12 preferably in the form of an air bag. The air bag is operably connected between rear leg 38 and main frame 14. Truss 34 is preferably connected by welding to main frame 14 and pivotally connected to leg brace 36.

Figure 28:
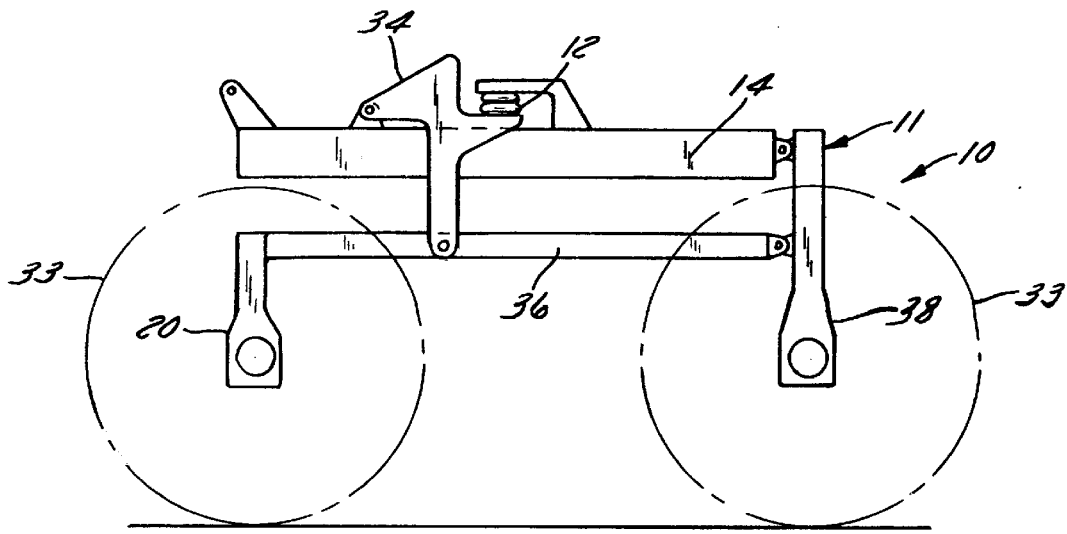

Still another embodiment of the invention is shown in FIG. 28. In this embodiment, independent suspension 12, in the form of an air bag, is connected between main frame 14 and a generally T-shaped truss 34. Rear leg 38 is pivotally connected to the main frame 14 and leg brace 36. Truss 34 is pivotally connected to leg brace 36. Front leg 20 is rotatably connected to leg brace 36.

Figure 29:
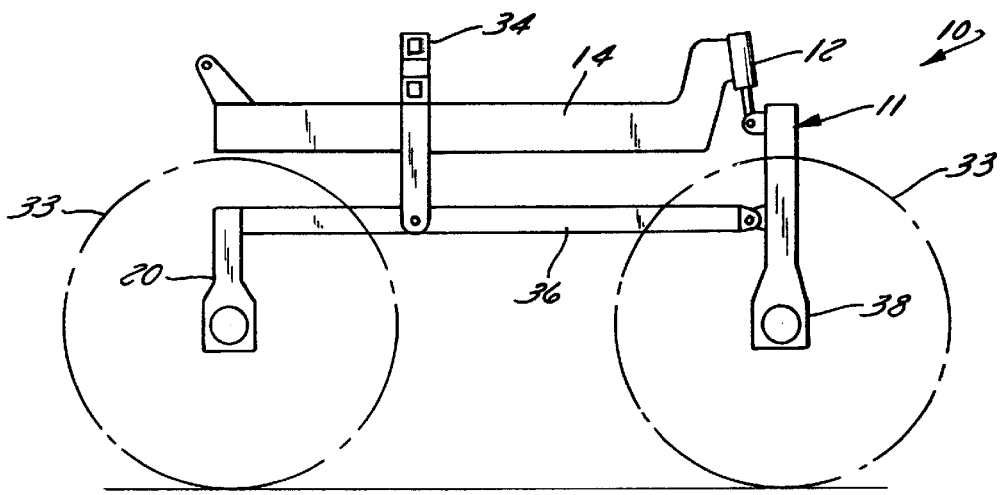

FIG. 29 shows yet another embodiment walking beam 11 and independent suspension 12. In this embodiment, independent suspension 12 is a cylinder connected between rear leg 38 and main frame 14. Rear leg 38 is pivotally connected to leg brace 36. Truss 34 is pivotally connected to leg brace 36 and affixed to main frame 14. Front leg 20 is rotatably connected to leg brace 36.

Figure 30:
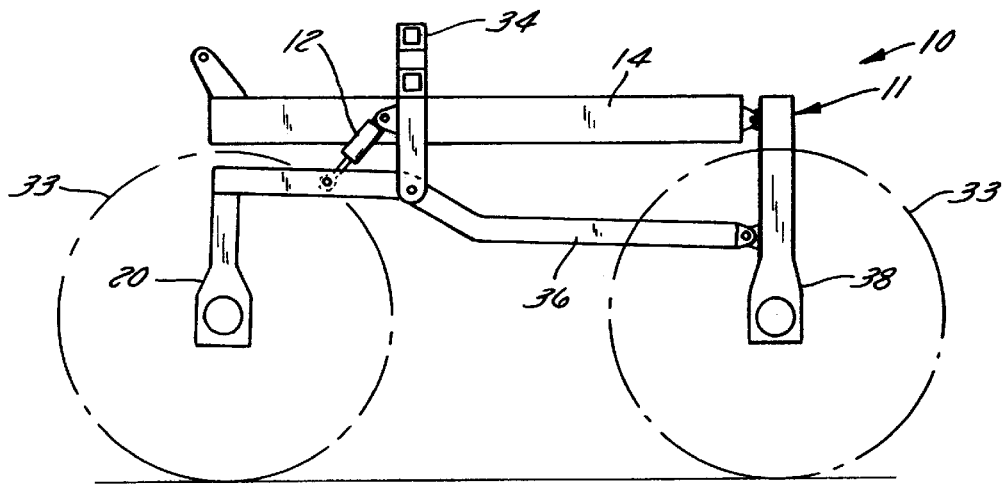

Still another embodiment is shown at FIG. 30 of walking beam frame 11 and independent suspension 12. Walking beam 11 is comprised of a main frame 14 affixed to truss 34 which is pivotally connected to a generally S-shaped leg brace 36. Independent suspension 12, in the form of a cylinder, is pivotally connected to truss 34 at one end and leg brace 36 at the other. Rear leg 38 is pivotally connected to main frame 14 at one end and leg brace 36 at another end. Front leg 20 is rotatably connected to leg brace 36.

Figure 31:
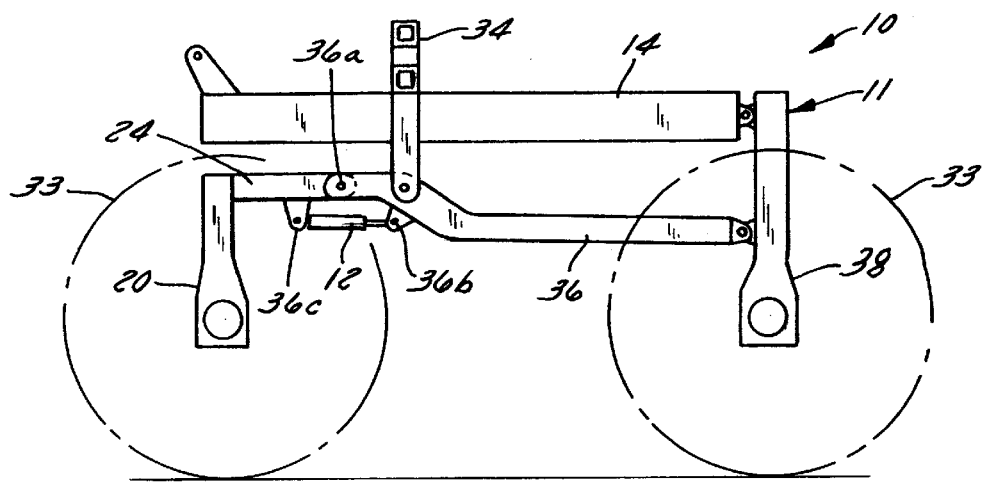

FIG. 31 shows yet another embodiment of the invention, wherein the walking beam frame 11 and independent suspension 12 include main frame 14 which is pivotally connected a first point to rear leg 38. Rear leg 38 is pivotally connected to generally S-shaped leg brace 36 at a second point. Truss 34 is affixed to main frame 14 and pivotally connected to leg brace 36. Swing arm 24 is pivotally connected to leg brace 36 at a pivot point 36a. Independent suspension 12, in the form of a cylinder, is pivotally connected at one end to swing arm 24 at a point 36c and pivotally connected at its other end to leg brace 36 at point 36b. Front leg 20 is rotatably connected to swing arm 24.

Figure 32:
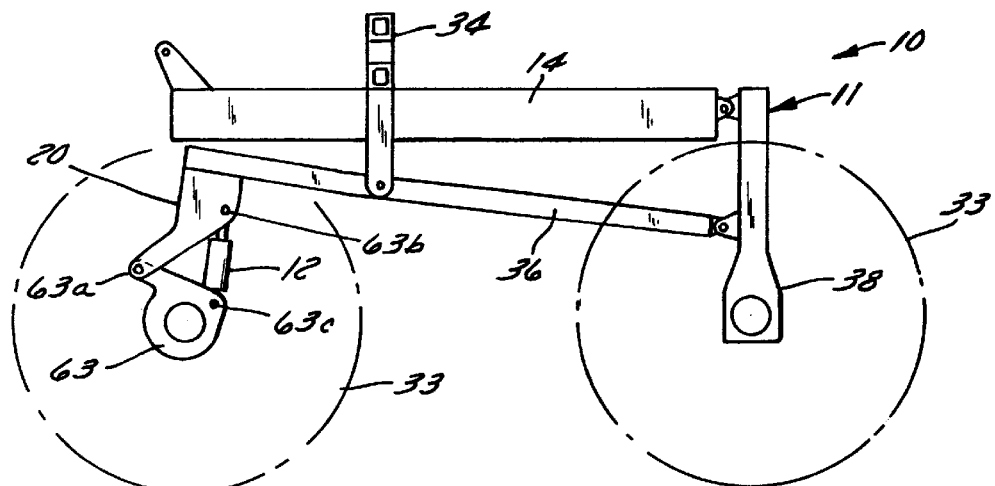

FIG. 32 shows still another embodiment of the invention. Walking beam 11 and independent suspension 12 include main frame 14 pivotally connected to rear leg 38. Rear leg 38 is pivotally connected at another point to leg brace 36. Truss 34 is affixed to main frame 14 and pivotally connected to leg brace 36. Independent suspension 12, in the form of a cylinder, is pivotally connected to a generally C-shaped front leg 20 at its upper end. At its lower end, the independent suspension 12 is pivotally connected to hub 63. Hub 63 is pivotally connected to the generally C-shaped front leg at a pivot point 63a by a pin.

Figure 33:
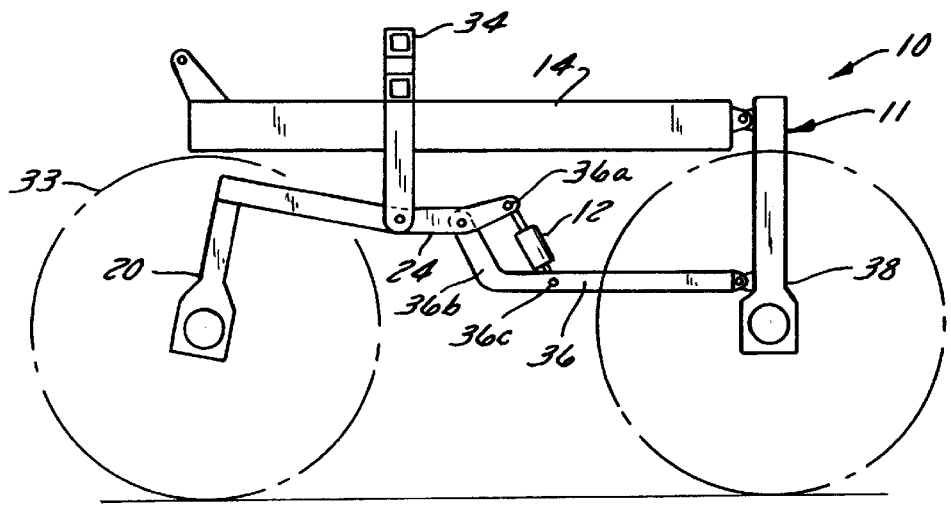

Yet another embodiment of the invention is shown at FIG. 33. In this embodiment, walking beam frame 11 and independent suspension 12 include main frame 14 affixed to truss 34 connected to a generally U-shaped swing arm 24. Rear leg 38 is pivotally connected to main frame 14 and leg brace 36. Independent suspension 12, in the form of a cylinder, is connected to swing arm 24 at a pivot point 36a by a pin. At a lower end, the cylinder 12 is pivotally connected to generally L-shaped leg brace 36 at a pivot point 36c by a pin. Leg brace 36 is connected to swing arm 24 at second pivot point 36b. Front leg 20 is rotatably connected to swing arm 24.

Figure 34:
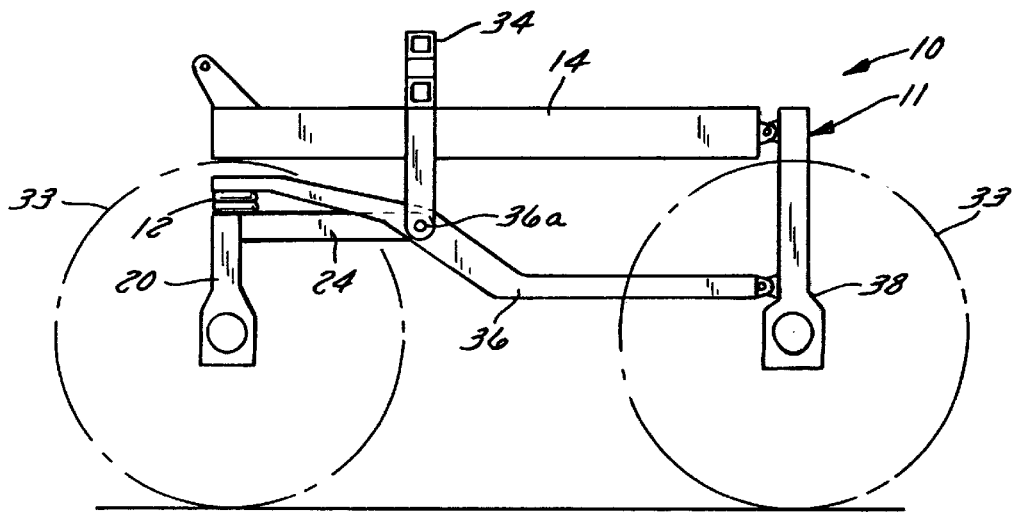

Another embodiment of the invention is shown in FIG. 34. Walking beam frame 11 and independent suspension 12 include main frame 14 connected to truss 34 and pivotally connected to leg brace 36. Truss 34 is pivotally connected to a generally S-shaped leg brace 36. Leg brace 36 is pivotally connected to rear leg 38. Swing arm 24 is pivotally connected to leg brace 36 at a pivot point 36a by a pin. Independent suspension 12, in the form of an air bag, is operably connected between the upper portion of the generally S-shaped leg brace 36 and swing arm 24. Front leg 20 is rotatably connected to swing arm 24.

Figure 35:
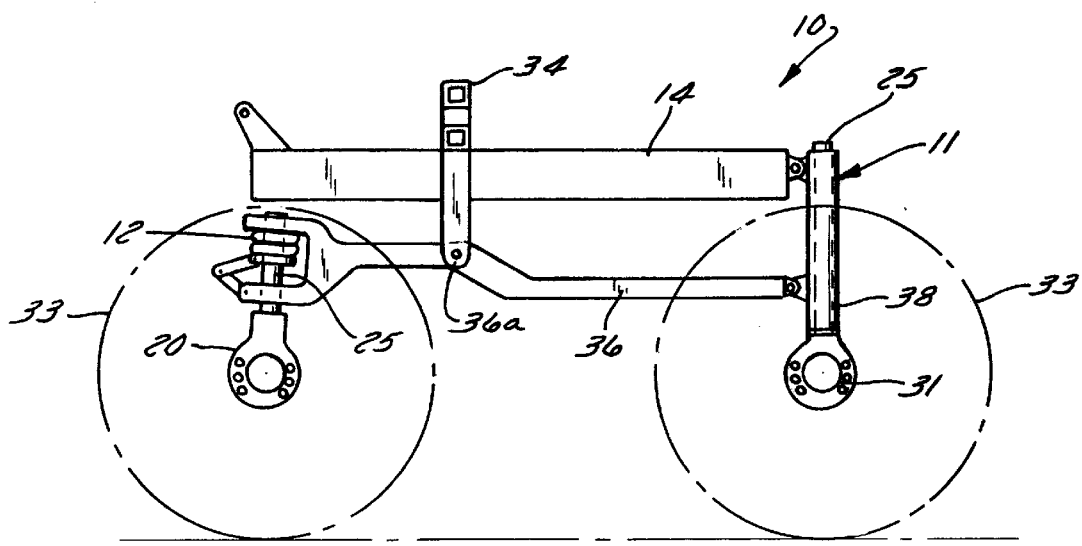

Yet another embodiment of the present invention is shown at FIG. 35. In the embodiment, the walking beam 11 includes main frame 14 connected to main truss 34. Main frame 14 is pivotally connected to rear leg 38. Rear leg 38 is connected to a generally S-shaped leg brace 36. Leg brace 36 is pivotally connected to truss 34 at a pivot point 36a by a pin. At a front end, leg brace 36 splits into a generally Y-shaped portion. Front leg 20 is provided with kingpin 25 to rotatably connect to the Y-shaped portion of leg brace 36. Rear leg 38 may be provided with a wheel hub mount 31 and a kingpin 25 to allow for steering of the rear wheel. This provides all-wheel or four-wheel steering. Independent suspension 12 in the form of an air bag is operably associated between the kingpin 25 and the Y-shaped portion of leg brace 36 as shown. In this configuration, independent suspension 12 is provided directly to leg 20 and indirectly to the rest of the walking beam at the pivot points.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. For example, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape (e.g. these include both cylindrical and square, etc.), and assembled in virtually any configuration. Further, although the leg brace 36 and swing arm 24 described herein are two physically separate modules, it will be manifest that the leg brace 36 and arm 24 may be integrated into a single member. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

We claim:

1. An agricultural vehicle comprising:
    an independent suspension for minimizing irritant of the vehicle;
    a walking beam frame connected to the independent suspension for providing support to the vehicle;
    a stacked assembly for cooling the vehicle including a condenser. an oil cooler connected to the condenser, and a radiator connected to the condenser;
    a door covering the stacked assembly;
    a generally cylindrical screen operably associated with the door;
    a plastic cover covering the screen;
    a fan blade for drawing air through the screen;
    an axle connected to the fan blade;
    internal baffles in communication with the axle; and
    a radiator fan for drawing air through the fan blade.

2. The vehicle of claim 1, wherein the vehicle has a ground clearance of about six feet under the beam frame and suspension.

3. The vehicle of claim 1, further comprising a tank carried by the frame having several integrated compartments including a product compartment for containing product.

4. The vehicle of claim 1, wherein the walking beam frame comprises:
    a main frame;
    a main truss connected to the main frame;
    a pair of leg braces connected to the main truss;
    an elastic member connected to each leg brace;
    a swing arm connected to each elastic member; and
    a rear telescoping axle beam connected to the main frame by a pin.

5. The vehicle of claim 1, further comprising a first side set and a second side set of wheels in operable association with the main frame, wherein the distance between first side set of wheels to the main frame is constant and wherein the distance between the main frame and the second side set of wheels can be adjusted relative of the main frame.

6. The vehicle of claim 1, wherein the beam frame comprises a main frame which includes two weldments, and the main frame is pivotally attached to an elastic member.

7. The vehicle of claim 1, wherein the beam frame has a variable width in relation to at least one side set of wheels.

8. The vehicle of claim 1, further comprising:
    tandem propel pumps for propelling the vehicle;
    a first drive motor connected to at least one propel pump to drive a first set of wheels on one side of the vehicle; and
    a second drive motor connected to at least one propel pump to drive a second set of wheels on an other side of the vehicle.

9. The vehicle of claim 8, wherein the drive motors act in combination with the walking beam frame to maintain near equal weight distribution of each side set of wheels and assures positive drive capability.

10. The vehicle of claim 8, wherein the tandem pumps are co-axially and directly mounted to an engine center line.

11. The vehicle of claim 1, further including at least one wheel and wherein the vehicle has a center of gravity having a generally equal distance to each of the at least one wheel so that there is positive drive to the wheel independent of unlevel ground conditions.

12. The vehicle of claim 1, further including a plurality of wheels having a wheel load pressure and wherein the frame distributes its weight evenly over the wheels such that the frame equalizes the wheel load pressure.

13. The vehicle of claim 1, further comprising a boom connected to the frame which includes valves mounted directly on the boom to allow for easy removal.

14. The vehicle of claim 1, further comprising:
    an extension arm including a primary member and a secondary member connected to the primary member; and
    a hydraulic cylinder directly attached to the primary member. wherein the second member of the arm folds approximately 180° when the cylinder strokes one full stroke for the first 90° of rotation to extend the secondary member past a pivot over center and then retracts for the remaining 90° to achieve a completed folded position.

15. The vehicle of claim 1, wherein the cylindrical screen is a hinged rotary screen for facilitating access to the radiator.

16. The vehicle of claim 3, further comprising a primary product pump mounted generally forward of the product compartment to improve flow characteristics.

17. The agricultural vehicle of claim 1, further comprising at least one leg connected to the axle, a kingpin integral with the leg, and a thrust washer including a plurality of interlocking segments for ease of maintenance carried by the kingpin.

* * * * *

UNITED STATES PATENT AND TRADEMARK OFFICE
CERTIFICATE OF CORRECTION

PATENT NO. : 6,454,294 B1
DATED : September 24, 2002
INVENTOR(S) : Roy A. Bittner et al.

It is certified that error appears in the above-identified patent and that said Letters Patent is hereby corrected as shown below:

Column 5,
Line 41, replace "fonning" with -- forming --.

Column 19,
Line 41, replace "irritant" with -- jarring --.

Signed and Sealed this

Twenty-third Day of September, 2003

JAMES E. ROGAN
*Director of the United States Patent and Trademark Office*